United States Patent [19]
Itoh

[11] 3,976,031
[45] Aug. 24, 1976

[54] ELECTRIC DISCHARGE COATING APPARATUS

[75] Inventor: Tsutomu Itoh, Tokyo, Japan

[73] Assignee: Onoda Cement Company, Ltd., Japan

[22] Filed: July 7, 1975

[21] Appl. No.: 593,722

[30] Foreign Application Priority Data
July 10, 1974 Japan............................. 49-078226

[52] U.S. Cl.............................. 118/629; 118/634; 118/638; 427/38
[51] Int. Cl.²........................ B05B 5/02; B05B 7/14
[58] Field of Search........... 118/629, 625, 627, 634, 118/638, 620; 219/76; 427/38, 39, 40, 41, 27

[56] References Cited
UNITED STATES PATENTS

| | | | |
|---|---|---|---|
| 3,098,150 | 7/1963 | Inoue | 219/76 |
| 3,318,790 | 5/1967 | Carbajal et al. | 427/41 |
| 3,600,218 | 8/1971 | Pennebaker | 427/38 |
| 3,677,799 | 7/1972 | Hou | 427/38 |
| 3,798,048 | 3/1974 | Brody et al. | 118/638 |
| 3,865,079 | 2/1975 | Kellams et al. | 118/629 |
| 3,874,333 | 4/1975 | Baker | 118/629 |

*Primary Examiner*—Mervin Stein
*Assistant Examiner*—Douglas Salser
*Attorney, Agent, or Firm*—Price, Heneveld, Huizenga & Cooper

[57] ABSTRACT

A face-silent discharge electrode which includes plural parallel electrode bars separated from each other at a distance and arranged in a face is disposed to confront a substrate. A powder coating material is supplied in the space between said electrode and said substrate. An AC voltage is impressed on the electrode bars adjacent each other to generate a silent electric discharge over the entire surface of said face-silent discharge electrode. Concurrently, a DC voltage is impressed between the electrode bars and the substrate so that the powder coating material may adhere to a surface of the substrate to form a layer of uniform thickness.

16 Claims, 33 Drawing Figures

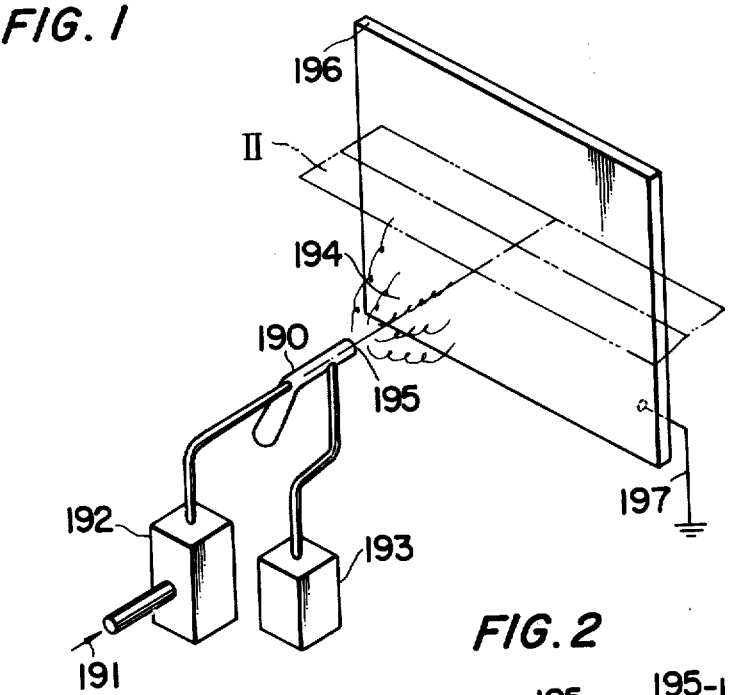
FIG. 1
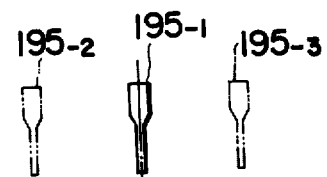
FIG. 2
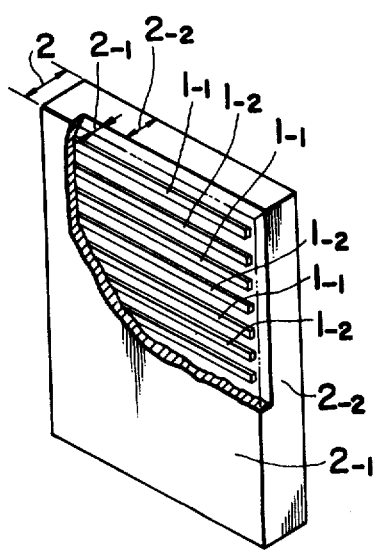
FIG. 3
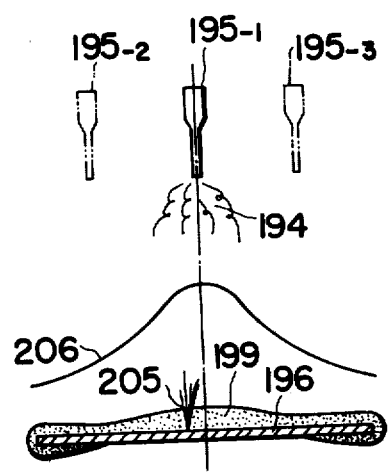

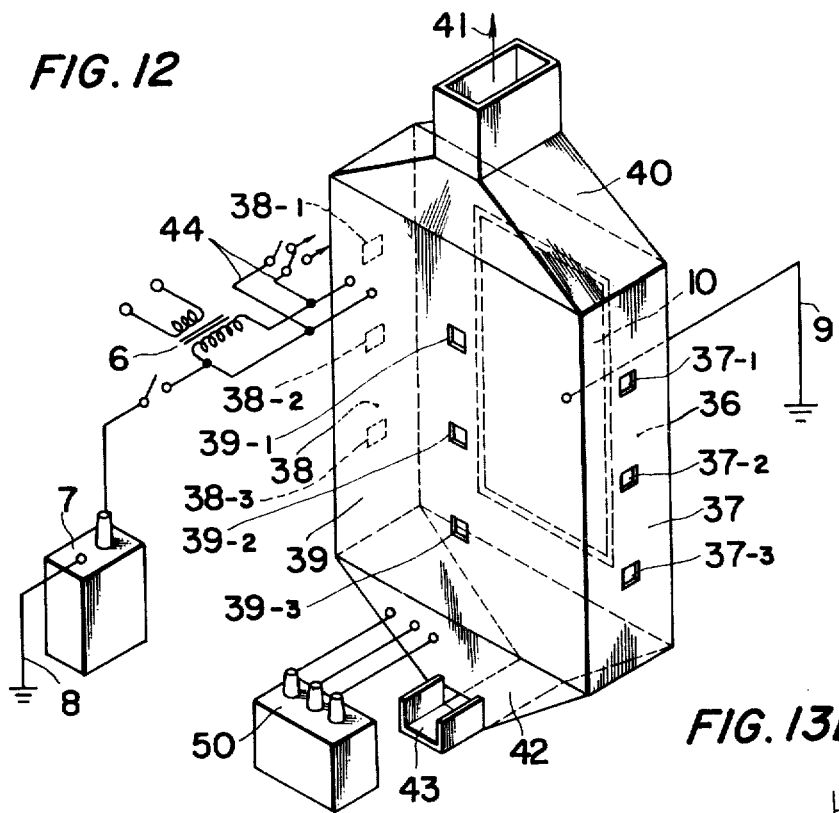
FIG. 12
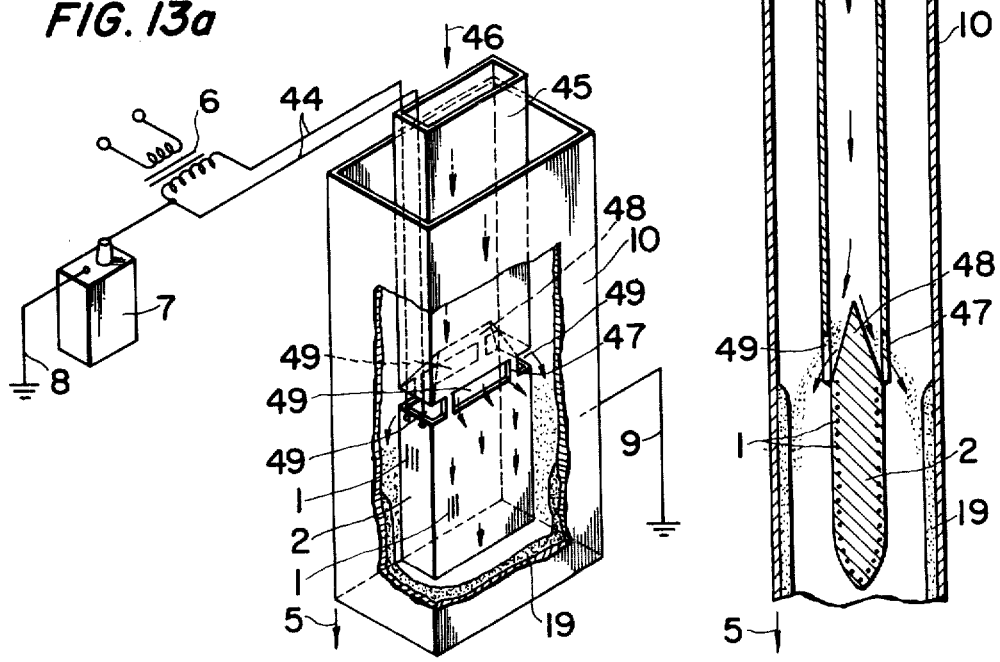
FIG. 13a
FIG. 13b

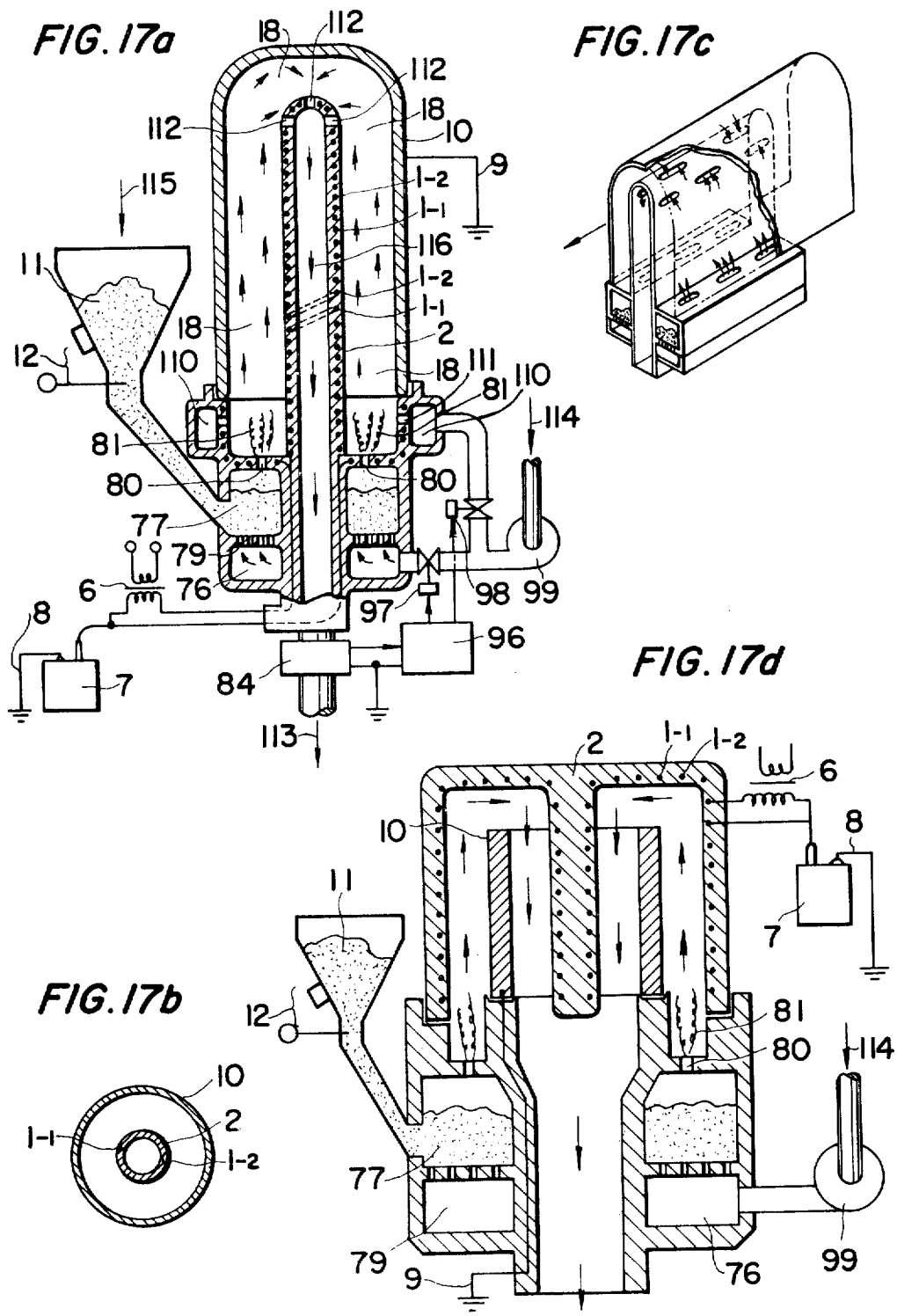

ELECTRIC DISCHARGE COATING APPARATUS

BACKGROUND OF THE INVENTION

This invention relates to an improvement in the electrostatic powder coating apparatus and more specifically to a powder coating apparatus which is characterized by comprising a face-silent discharge electrode capable of generating a silent discharge in the form of a face which is arranged to be separated from and to confront a substrate, means for supplying powder coating material between them, and means for impressing a voltage between the face-silent discharge electrode and the substrate.

In electrostatic powder coating apparatus of the prior art, a powder coating material suspended in the air by means of compressed air is injected against a substrate from a nozzle of a spray gun disposed to be separated from and to confront the substrate. Simultaneously, a high DC voltage is impressed on the nozzle of the gun to generate a corona discharge there. The powder in the coating space is charged by virtue of said corona discharge and lines of electric force from the tip of the gun to the substrate. Charged coating material is transferred to a surface of the substrate by a coulomb force caused by the electric field between the tip of the gun and the substrate to form a coating layer of powder material on the surface of the substrate. Thereafter, the resulted layer is baked by heating. This is a usual way to obtain a coating on a substrate.

In the prior process of electrostatic powder coating, currents caused by a gun concentrates at said gun. Thus, the formed powder coating material layer is thick in front of the gun and becomes thinner and thinner as the coated place is more and more distant from the gun. Accordingly, an evenly thick layer is difficult to obtain unless the gun is moved. When the gun is moved in the plane parallel to the surface of the substrate in pursuance of obtaining an even coating, the over spray of powder in the both sides increases and it is inevitable that the coating efficiency remarkably decreases.

In addition, as a result of the currents concentrating in front of the gun, the voltage drop by ionic currents at the central part exceeds the spark voltage of the layer of powder having a high resistivity, such as those employed now, before the sufficient thickness of layer is obtained in the peripheral parts. Consequently, a back ionizing phenomenon arises to form pinholes and surface roughness in the powder layer. This is a serious drawback of the prior art powder coating systems.

In prior powder coating systems, even though the efficiency of the gun itself attains a value of 80 - 90%, ignoring the shape of a substrate, it is usual that the coating efficiency attains a value of not more than sixty percent in an actual coating process. The current and the field concentrate at the front of the gun. Moreover, a corona discharge is generated at the tip of the gun. Thus, the electric field remarkably concentrates at this place. A powder layer tightly adheres to the tip of the gun by the so-called gradient force to change the voltage-current characteristic. Accordingly, the coating process cannot be stably continued unless the operation is frequently interrupted and the tip of the gun is cleaned. This is a serious drawback of the prior process for powder coating.

Further, when the physical shape of the gun is determined and a voltage of a definite value is impressed on the gun in the case of the prior powder coating process, the obtained current has unequivocally a definite value. It is impossible to mutually independently select a value of current and a value of voltage depending on the properties of a powder used. This is responsible for the impossibility of improving properties of the coating. An electrode having a sharp tip is typically employed for generating a corona discharge according to prior electrostatic powder coating systems. A spark due to the corona discharge can run towards the substrate and when a combustible coating material powder is employed, the coating apparatus is in danger of igniting and exploding.

SUMMARY

One object of this invention is to provide an electrostatic powder coating system which has no drawbacks of the prior electrostatic powder coating systems, enables to obtain an excellent coating having uniform thickness, no pinholes and no surface roughness, and having a remarkably high efficiency. An apparatus according to the system of this invention can be constructed in a small size, can be continuously operated for a long period of time, and is not in danger of being ignited by a spark and exploding.

Another object of this invention is to provide a powder coating apparatus which has up to ten times the performance of the apparatus of the prior art.

A further object of this invention is to provide an electrostatic powder coating apparatus where a coating material powder not adhered is easily recovered and environmental pollution is thus prevented.

The foregoing objects and other objects are achieved by the present invention which comprises an improved electrostatic powder coating apparatus. The apparatus is characterized by comprising a face-silent discharge electrode capable of generating a silent discharge in the form of a face which is arranged to be separated from and to confront a substrate, means for introducing the powder coating material into a coating space between them, and means for impressing a voltage between the face-silent discharge electrode and the substrate.

The above-mentioned objects and features of this invention will become more understandable by reference to the following description taken in conjunction with the accompanying drawings, in which:

BRIEF DESCRIPTION OF THE DRAWINGS

FIG. 1 is a perspective view of a prior art apparatus used for electrostatic powder coating;

FIG. 2 is a cross-sectional view taken along the planae II in FIG. 1;

FIG. 3 is a perspective view, partially cut away, of a face-silent discharge electrode which constitutes a part of the apparatus of this invention, showing the internal structure thereof;

FIG. 9b is a schematic diagram illustrating the construction of the electrode shown in FIG. 9a;

FIG. 12 is a perspective view of a fourth embodiment of the powder coating apparatus of this invention;

FIG. 13a is a perspective view, partly broken away, of a fifth embodiment of the powder coating apparatus of this invention;

FIG. 13b is a longitudinal cross section of the embodiment shown in FIG. 13a;

FIG. 17a is a side view, partially showing sections, of a ninth embodiment of the powder coating apparatus of this invention;

FIG. 17b is a traverse cross section of a part of the embodiment shown in FIG. 17a;

FIG. 17c is a perspective view of a tenth embodiment of the powder coating apparatus of this invention;

FIG. 17d is a side view, partially showing sections, of an eleventh embodiment of the apparatus of this invention;

FIG. 19b is a longitudinal cross-sectional view of a part of the embodiment shown in FIG. 19a;

FIG. 20b is a longitudinal cross-sectional view of a part of the embodiment shown in FIG. 20a.

DETAILED DESCRIPTION OF THE PREFERRED EMBODIMENT

Figure 4A:
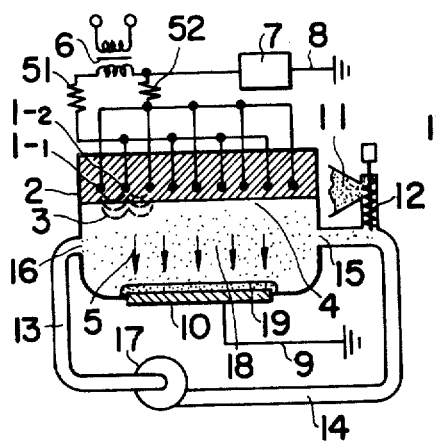
FIG. 4a is a schematic illustration, locally showing cross sections, of the first embodiment of the apparatus according to this invention.

Referring now to FIGS. 1 and 2 which illustrate a prior art electrostatic coating apparatus, a spray gun is denoted by the reference numeral 190, a compressed air source by the reference numeral 191, a storage bin for powder coating material by the reference numeral 192, a power source by the reference numeral 193, a powder coating material by the reference numeral 194, tips of the gun by the reference numerals 195, 195-1, 195-2 and 195-3, a substrate by the reference numeral 196, an electric wire by the reference numeral 197, and a coating by the reference numeral 199. Back ionization occurs at location 205. The distribution of electric current is denoted by a curve identified by reference numeral 206. In addition, an imaginary plane II is depicted for locating the cross section in FIG. 2.

In an apparatus of this invention as shown in FIG. 4a, a face-silent discharge electrode 2 is disposed generally parallel in front of a substrate 10, both being separated by a space 18. In this case, the substrate 10 is a plane board. A powdery coating material 11 is allowed to pass in small amounts from a feeder of coating material to a duct 15 and is suspended in a conveying air which is circulated in a closed circuit composed of a duct 15, a duct-recovering opening 16, a duct 13 and a duct 14 by means of a fan 17. The suspended coating material is thus fed to a coating space 18. The face-silent discharge electrode 2 which embodies an essential feature of this invention has the mechanical structure as shown by FIG. 3. In the electrode, two alternate groups of parallel electrode bars 1—1 and 1—2 are arranged at equal distances beneath but near the surface of an insulator 2. As shown in FIG. 4a, a group of every other bar is connected in common to a terminal and the other group to another terminal. A high alternating voltage is impressed between said terminals by means of an alternating current source 6 (FIG. 4a). As a result of the impressed voltage, alternating lines of electric force 3 in a form convex to the outside of the face-silent discharge electrode appear between electrode bars 1-1 and 1-2. When the strength of the alternating electric field at the surface of the face-silent discharge electrode 2, i.e., the density of these lines of electric force, becomes higher than the sparking voltage of a surrounding gas, a silent discharge appears all over the surface of this face-silent discharge electrode. In this condition, positive and negative ions and free electrons as plasma emerge over the entire surface.

Accordingly, when the potential of said face-silent discharge electrode is maintained high by means of a DC source 7 coupled as shown in FIG. 4a with a conductor 8 and a substrate is concurrently brought into an electrical connection with ground via conductor 9, only ions of the same polarity, positive or negative, are selectively extracted from said plasma over the surface of the face-silent discharge electrode and pass toward the substrate 10, as shown by arrows 5. As this occurs, suspended powder particles of coating material 11 which have been conveyed from a feed opening 15 for coating material powder to the coating chamber 18 are electrically charged by these ions of the same polarity and are promptly attracted to the surface of substrate 10 to form a coating powder layer 19 thereon. In this case, the distribution of the density of the current which is carried by coating material powder particles and ions both entering the surface of the substrate is uniform in a high degree, because lines of electric force in the coating space 18 which are directed from the face-silent discharge electrode to the substrate 10 forms a uniform field. Thus, a coating 19 having a high degree of evenness is formed on the surface of substrate 10 within some seconds.

Figure 4B:
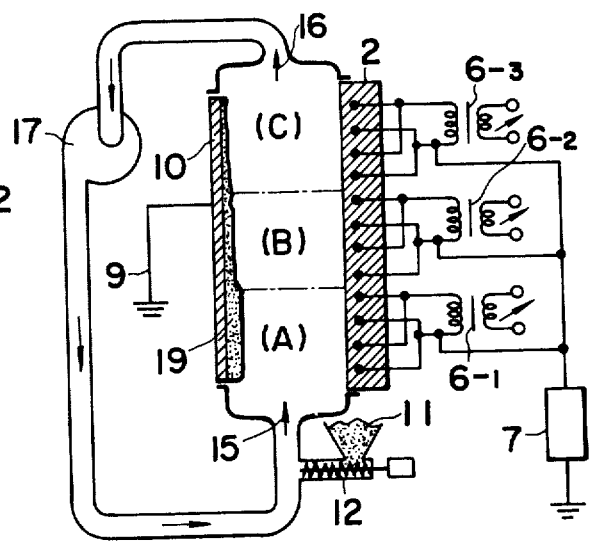
FIG. 4b is a schematic illustration, locally showing cross sections, of a second embodiment of the apparatus of this invention.
Figure 4C:
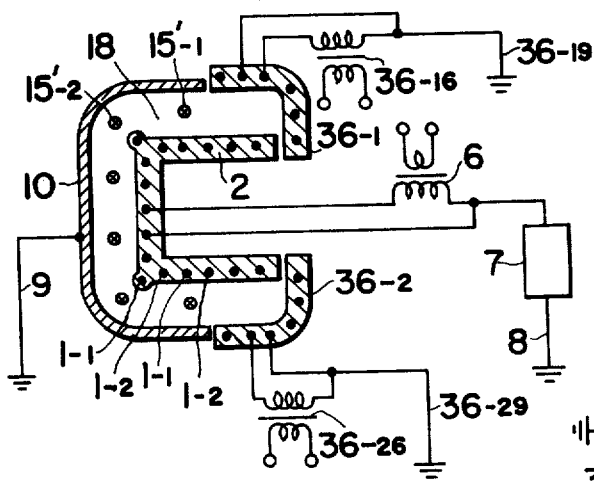
FIG. 4c is a schematic illustration, locally showing cross sections, of a third embodiment of the apparatus according to this invention.
Figure 4D:
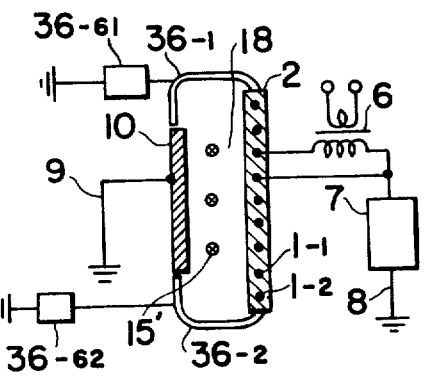
FIGS. 4d, 4e and 4f are schematic diagrams illustrating the confronting of a face-silent discharge electrode and a surface of a substrate to be coated.
Figure 4E:
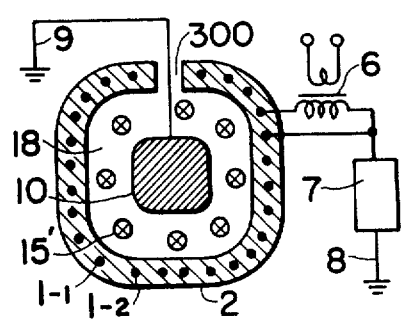
Figure 4F:
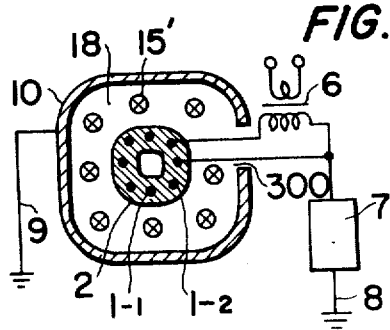
Figure 5:
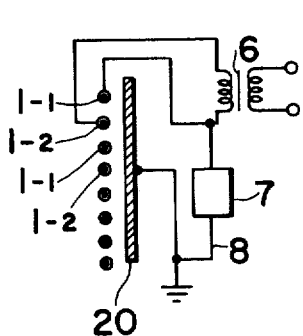
FIGS. 5, 6, 7 and 8 are schematic diagrams, partly in cross section, of various face-silent discharge electrodes which pertain to this invention.

In accordance with the powder coating apparatus of this invention, the conspicuous effectiveness can be sufficiently appreciated in many cases where the space including coating material powder is enclosed with a face-silent discharge electrode or electrodes and a substrate as is shown by FIG. 4d, 4e or 4f. These figures illustrate the way that a face-silent discharge electrode is separately disposed in front of a substrate.

The way, detailed in the explanation above for FIG. 4a, that a face-silent discharge electrode is arranged separately in front of a substrate is shown in FIG. 4d. The powder coating apparatus therein is constructed so that a dispersed powder is introduced perpendicularly towards the back of the sheet as shown by arrows 15' in the space 18 which is between a substrate 10 and a face-silent discharge electrode 3 separated from and confronting the former. In order that the surface density of lines of electric force, passing from the face-silent discharge electrode 2 to the surface of the substrate 10 have a predetermined distribution at the surface of the substrate 10 and escaping of powder particles is effectively prohibited, guard rings 36-1 and 36-2 can be arranged. To summarize, enclosing the coating space 18 principally with a face-silent discharge electrode 2 and a substrate 10 is one feature of this invention for arranging the substrate separated from and confronting the face-silent discharge electrode.

A second representative embodiment for arranging the substrate separated from and confronting the face-silent discharge electrode in accordance with this invention is shown in FIG. 4e. In this embodiment, the space 18 in which a coating material powder exists is enclosed with the surface of a silent discharge electrode 2 and a substrate 10 almost the entire surface of which is surrounded by the face-silent discharge electrode. An interstice 300 may be made in a part of the face-silent discharge electrode 2 for disposing a device 9 which introduces and supports a substrate 10 in a predetermined position, and connects it to ground. Such interstice, however, does not interfere with the operation of this invention.

In FIG. 4e, arrows 15' show the direction of flow of coating material powder in a coating chamber 18 perpendicularly into the plane of the drawing sheet. The details of connecting every electrode bar 1-1 or 1-2 with an AC source is omitted, as in FIG. 4d.

FIG. 4f illustrates the third representative embodiment of arranging the substrate separated from and confronting the face-silent discharge electrode in accordance with this invention. The surface to be coated is the inner surface of a substate 10. The apparatus is composed so that the substrate 10 may encompass a coating space 18 where a coating material powder introduced as shown by arrows 15' is suspended. Inside the substrate is disposed a face-silent discharge electrode 2 the surface of which confronts the inner surface of the substrate with interposing a coating space 18 containing coating material powder. In this arrangement also, a passage 300 may be made in a part of the substrate so that the face-silent discharge electrode may be mechanically supported and provided with necessary AC and DC voltages. The existence of said passage should be considered to have no relation to the essential feature of this invention. Although detailed connection of an AC power source 6, a DC power source 7 and a conductor 8 of the face-silent discharge electrode and an earthing conductor 9 for the substrate 10 are omitted in FIG. 4f, all of them are the same as in the explanation mentioned above. As mentioned above in detail, the embodiments of arranging a face-silent discharge electrode separated from and confronting a surface to be coated of a substrate according to this invention can be summarized as an essential feature that a space including a coating material powder is enclosed with a face-silent discharge electrode and a surface to be coated.

The great advantage in the embodiment of disposing a surface to be coated of a substrate separated from and confronting a face-silent discharge electrode of the apparatus of this invention is based on that the form of said face-silent discharge electrode can be shaped, depending upon the shape of a substrate. When this is the case, the shape of face-silent discharge electrode may be modified so that both the surface density of lines of electric force, terminating at the surface of the substrate, in said surface of substrate and the density of the current flowing into the surface to be coated of the substrate may be generally uniform. By virtue of these conditions, the evenness of the coating on the surface of a substrate is greatly enhanced. These advantages can be never obtained by a prior art gun for electrostatic powder coating employing a corona discharge wherein lines of electric force can be produced at no other points than a tip of said gun. As explained in connection with FIG. 4a, when a surface to be coated is planar, the conditions that both the surface density of lines of electric force, terminating at the surface of the substrate, in said surface of substrate and the density of the current flowing into the surface to be coated of the substrate should be uniform are satisfied by arranging a planar face-silent discharge electrode separated from, confronting and parallel to the surface of the substrate to be coated. No prior gun for powder coating employing corona discharge can satisfy the conditions as mentioned above.

When a substrate 10 has the shape of a long channel as shown in FIG. 4c where a traverse cross-sectional view of said substrate is depicted, a mere plane face-silent discharge electrode separated from and confronting the substrate cannot give a uniform surface density of lines of electric force and a uniform current density in the surface to be coated of substrate 10, i.e., the inner surface of substrate 10. In this instance, a face-silent discharge electrode 2 having a U-shaped section is arranged so as to maintain a nearly equal distance from the surface of the substrate to be coated. Since the distance between the parts of the surface of the substrate to be coated and the confronting face-silent discharge electrode are generally equal, the surface density of lines of electric force, terminating at the surface of the substrate, and also the current density in the surface of the substrate are nearly uniform. Thus, the powder which has been introduced as denoted by arrows 15'-1 and 15'-2 can form a powder layer excellent in evenness on the inner side of U-shaped substrate 10 within a short period of time.

In this embodiment (FIG. 4c), guard rings 36-1 and 36-2 may be disposed to regulate the disturbance of the electric field at the end parts of the substrate, if necessary. The inner sides of the guard rings directly face the coating space 18 and can be face-silent discharge electrodes or curtains for an electric field, if desired. To energize them, power sources 36-16 and 36-26 as well as conductors 36-19 and 36-29 can be employed. In FIG. 4c, a detailed wiring diagram for electrode bars 1-1 and 1-2 disposed near beneath the surface of face-silent discharge electrodes is omitted. As detailed above in connection with FIG. 4c, the shape of the face-silent discharge electrode to be disposed separated from and confronting the surface of substrate can be modified so that both the surface density of lines of electric field, terminating at the surface of substrate, and the current density in the surface of substrate is uniform. The forming of a coating of even thickness on the substrate as a result of the above construction constitutes an advantageous feature of this invention.

In addition to the face that in the powder coating apparatus of this invention the ionic current density into the surface of the substrate can be maintained at a definite value, another advantageous fature of this invention is that the current density can be changed. Depending upon the substrate, the thickness of the resultant powder layer on the substrate can be controlled, as desired.

Referring now to FIG. 4b, a very long substrate 10 extends vertically from a feed opening 15 of powder coating material to an over spray-recovering opening 16. If the coating is practiced with a face-silent discharge electrode generating a uniform intensity of silent discharge on the surface along its entire length caused by impressing the same AC voltage from a power source 6 as shown in FIG. 4a, then the powder layer 19 formed on the substrate 10 usually in thickest near the feed opening 15 for a powdery coating material, a little thinner in the intermediate position, and thinnest near the over spray-recovering opening 16. However, this tendency to form an uneven layer is conspicuously lower as compared with results from prior art spray guns. The coating unevenness is not adequate when a uniformly thick layer is desired. This problem can be solved by dividing the electrode bars beneath and near the surface of the face-silent discharge electrode 2 into, for example, three groups and impressing an AC voltage having a different peak value on each of groups by means of AC sources 6-1, 6-2 and 6-3, as shown in FIG. 4b.

There are various procedures to achieve the requirement of evenness of coating. For example, a sufficiently strong current is initially allowed to flow through parallel electrode bars in area A by an impression of a high voltage. Initially, the electrode bars in areas B and C also are impressed with the same voltage as that in area A. Thus, as a sufficiently thick powder layer is obtained in area A within an earlier period, the voltage of source 6-1 for impressing voltage on electrode bars in area A is regulated to a lower level after a certain period of time. Then, after a certain period of time, the voltage of source 6-2 for impressing an AC voltage on electrode bars in area B is lowered. The high AC voltage impressed on electrode bars in area C is maintained to the last by the source 6-3. As a result, a powder layer having a high uniformity in thickness throughout its entire length, i.e. from the place near the feed opening 15 for powder coating material to the place near the over spray-recovering opening 16 is obtained on the substrate 10.

Thus, it is unnecessary, in accordance with this invention, to move the spray gun itself for obtaining an even powder layer on a substrate, as in a prior electrostatic powder coating apparatus. According to this invention, the discharge current density can be controlled depending upon the time and the locality on the substrate and it is possible to control the thickness of a coating on a substrate as desired. These points constitute an excellent feature of this invention. In FIG. 4b, the DC voltage impressed is common among areas A, B and C. However, a DC voltage which varies, depending upon the time and the locality, can be applied to each of areas A, B and C to control the thickness or other properties of a powder layer on a substrate 10 of high quality. As detailed in the explanation above as to the powder coating apparatus of this invention, an excellent coating having a uniform thickness and no pinholes is obtained by modifying the shape of face-silent discharge electrode, or by dividing the face-silent discharge electrode into areas and impressing a controlled DC voltage and/or a controlled AC voltage, depending upon the time and the locality, independently on each of the divided areas. Moreover, a combination of modifying the discharge electrode and impressing a controlled voltage can bring an excellent even layer of powder on substrates of more complicated shapes.

The first characteristic of the powder coating apparatus according to this invention consists in that the evenness in thickness of the coating obtained is very good and the coating has an extremely low surface roughness and no more than a few pinholes. This is due to the facts that the electric field in the coating space 18 of powder coating apparatus of this invention is approximately homogeneous and the density of current which flows into the substrate 10 is nearly homogeneous, as elucidated by the explanation of FIG. 4a. Thus, the generation of pinholes and surface roughness due to back ionizing phenomenon caused by non-uniformity of current density is prevented, and a powder layer even in thickness is obtained, as opposed to that obtained in prior apparatus as shown in FIG. 2.

The second characteristic of the powder coating apparatus of this invention consists in that the thickness of the coating to be obtained can be easily controlled. In the powder coating apparatus of this invention, a current density flowing the coating space 18 and a field strength in the coating space 18 can be mutually independently adjusted by controlling mutually independently an AC source 6 and a DC source 7. Accordingly, a thickness of a powder layer to be obtained can be changed within a broad range as required by the properties of the powder employed. For example, in the case of the powder having a relatively high electric resistivity, an extremely thick coating may be obtained by limiting the current to a low value and applying a high field strength. A thin coating may be obtained by flowing a relatively strong current and applying a relatively weak field. The control of thickness can be easily performed as mentioned above.

The third characteristic of the powder coating apparatus of this invention consists in that the coating efficiency markedly increases. In accordance with this invention, charging powder particles in the coating space 18 can be performed at a high efficienty, because a powder in a well dispersed state is fed into the coating space 18. Moreover, the field strength can be increased to a high value, as compared with that in a prior electrostatic powder coating apparatus, because the field strength in the coating space is uniform. As the efficiency of charging powder particles is high and the field strength is high, adhering of powder coating material to the substrate is performed markedly efficiently, and the efficiency of adhering may be close to 100% in almost all cases. In the powder coating apparatus of this invention, feeding and recovering of powder is performed within a closed space or a closed circulating conduit and the efficiency of adhering is conspicuously high. Hence, the amount of over spray produced is very small. In addition, no over spray produced is emitted out 100% the system. The rate of recovering attains to 100% and no problem of dust pollution arises. These remarkable effects constitute the fourth characteristic of the powder coating apparatus of this invention.

The fifth characteristic of the apparatus according to this invention consists in that the size of said apparatus is markedly small. This is due to the fact that a suspension of coating material powder which has been preliminarily dispersed in a gas may be distributed over the surface of the electrode and powder particles are driven into the coating space from everywhere above the surface. Thus, it is unnecessary to force the coating material powder to disperse during the flight of powder blown from a gun to a substrate, such as is the case with prior spray guns. Accordingly, the face-silent discharge electrode can be disposed very close to the substrate. Usually, a distance of 5–20 cm from a substrate is sufficient. In an extreme case, disposing the electrode within one centimeter from the substrate is possible. Moreover, a remarkably high field strength is obtainable, because the electric field in the coating space 18 is nearly uniform. These factors enable the size of the apparatus to be remarkably decreased. Additionally, the apparatus of this invention requires no booth construction.

The sixth characteristic of this invention consists in that the performance of the apparatus is very good. As referred to above in connection with the fifth characteristic, the discharge electrode can be arranged very near to the substrate, and the field strength between them can be very high. Accordingly, the velocity of flight of powder particles to the substrate is very high. In addition, powder particles are fed from everywhere. Hence, the entire surface of substrate can be coated all at once without any motion of a spray gun. Thus, the powder coating apparatus of this invention can easily have to ten times the performance of prior powder coating apparatus, even though the former has a fraction of the size of the latter.

The seventh characteristic of the powder coating apparatus of this invention consists in that a continuous automatic operation for a very long time is practicable without any maintenance service. This is mainly due to the fact that powder particles cannot adhere to the face-silent discharge electrode by virtue of a repulsion force to powder particles with which said discharge electrode is essentially provided. As illustrated by FIG. 4a, alternating lines of electric force 3 between electrode bars adjacent each other which are convex to the outside cover the entire surface of the face-silent discharge electrode according to this invention. Thus, a charged powder particle in the area near the surface oscillates along a line of electric force convex to the outside. As a result, said particle is always subject to a centrifugal repulsion away from the electrode surface. For this reason, no powder particles in the coating space adhere to the surface of a face-silent discharge electrode.

In accordance with this invention, no adherence of powder particles to the electrode surface due to a gradient force arises, because of a concentration of DC lines of electric force at the tip of spray gun such as that in prior apparatus since the electric field in the coating space is nearly uniform. By reason of these two points, no powder coating material particles adhere to the discharge electrode of powder coating apparatus of this invention. Interruptions of operation and maintenance services for removing powder particles adhered to the tip or baffles arranged nearby as in the case of a prior powder coating apparatus is entirely eliminated. Therefore, a continuous operation can be easily practiced for a long period of time without maintenance service.

The eighth characteristic of the powder coating apparatus of this invention consists in that said apparatus is remarkably safe. As the discharge energy generated is distributed on the entire surface of an electrode, no fire can be caused by electric discharge. To the contrary, the electric field concentrates at a point, i.e., a tip of spray gun in a prior electrostatic coating apparatus employing corona discharge. Thus, it is quite probable to induce a spark discharge at said point and a serious accident of ignition and explosion. To prevent these accidents, the tip of spray gun is usually connected to a power source via a high resistance. Although an apparatus of this invention does not have such danger in principle by the reason mentioned above, high resistances 51 and 52 may be inserted for further safety. Conductor electrodes of a powder coating apparatus of this invention can be made to have no exposed surface. It is not extravagant to say that, in addition to high resistances above, the existence of a non-conductive material or an insulator which covers surfaces of conductor electrode bars bring about no chance of generating a spark discharge. Thus, the powder coating apparatus of the present invention has a very high safety as compared with apparatus of the prior art.

In addition to the eight characteristics enumerated above, this invention can be said to have a feature, in an aspect, that the apparatus is devised according to a novel technical idea entirely different from the prior electrostatic powder coating apparatus employing a so-called spray gun and booth. The powder coating apparatus of the present invention cannot be divided into a spray gun part and a booth part according to the concept of the prior art. As elucidated above, an efficiency of adhering as high as 95% or more is usually attained in a discharge space by the method of this invention. The apparatus can be constructed so as to automatically recover powder particles not adhered in the system. And the recovered particles as such can be employed again. Thus, there is no generation of a so-called over spray. In other words, the recovering device in itself can be said to be a spray gun in the case of the apparatus according to this invention. Therefore, the apparatus of this invention has an epoch-making performance in that powder coating is always performed with an efficiency of almost 100% and no environmental pollution is created.

Figure 11:
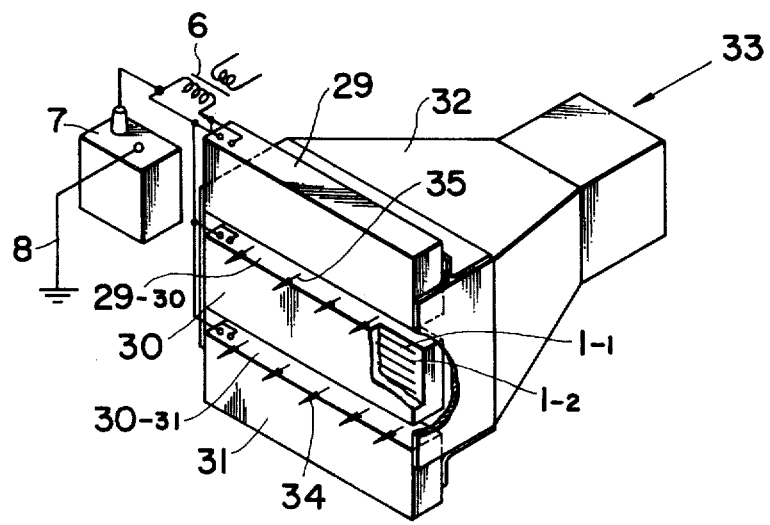
FIG. 11 is a perspective view of another embodiment of a face-silent discharge electrode.

Various modifications of the combination of the face-silent discharge electrode and a powder feeder within the scope of this invention will now be described. The apparatus shown by FIG. 4a where a face-silent discharge electrode is generally board-shaped and a coating material powder suspended in a gas is fed from a peripheral part is no more than one embodiment of this invention. There are many possible variations of the combination of the face-silent discharge electrode and the feeder of coating powder in accordance with the present invention. The apparatus can be constructed as illustrated by FIG. 11 where the face-silent discharge electrode is divided into three parts 29, 30 and 31 and they are separated from each other by slits 29-30 and 30-31. A mixture of a coating powder and a gas which has been fed, as shown by arrow 33, passes through a hood 32 and is injected through the two slits against a substrate, as shown by arrows 34 and 35. Some parallel electrode bars 1-1 and 1-2 are horizontally buried beneath and near the surfaces of three face-silent discharge electrodes 29, 30 and 31. A high AC voltage from an AC source 6 is impressed thereon to generate a stable silent discharge over the entire surfaces of electrodes 29, 30 and 31. The DC power source 7 and the conductor 8 supply a potential between the face-silent discharge electrode and a substrate not shown. In this embodiment as well as in other embodiments, the high DC voltage to be impressed from the DC source is not necessary to have a definite value. A high pulsed voltage may preferably be used in some cases.

Figure 9A:
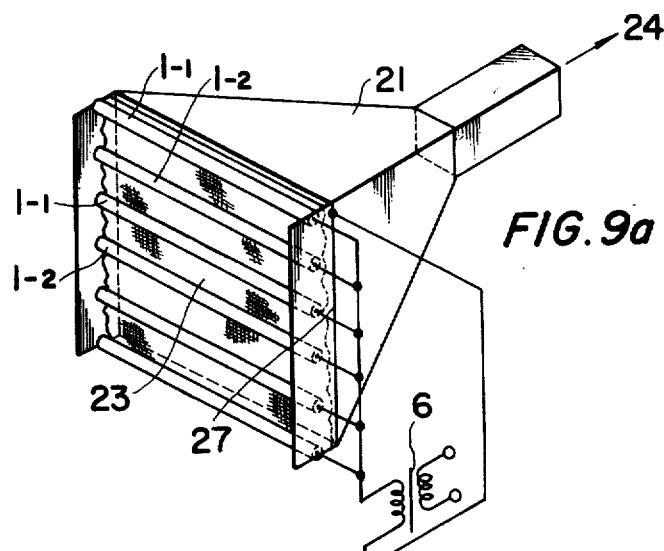
FIG. 9a is a perspective view of one embodiment of an exhausting-type face-silent discharge electrode employed in this invention.

In FIG. 9a, there is shown a perspective view of one embodiment of exhausting-type face-silent discharge electrode employable in this invention. In the structure of said embodiment, electrode bars 1-1 and 1-2 which have been disposed parallel and at equal distances are separately coated with an insulator or a semi-conductor and all electrode bars adjacent each other are connected to one side of the source 6. A filter cloth 23 is positioned behind the array of electrode bars. A porous plate 27 is arranged behind cloth 23. The sectional view of the structure of the electrode is shown in FIG. 9c. All these parts are fixed to a hood 21 to which a duct 24 is connected. An AC voltage is impressed between the electrode bars 1-1 disposed in the front end part of the hood and the porous plate 27 disposed behind the filter cloth 23.

In a face-silent discharge electrode thus connected with the power sources, a silent discharge is generated between the electrode bars 1-1 and the porous plate 27. In the face-silent discharge electrode shown by FIG. 9a, a silent electric discharge is generated in the space in the form of a layer between the face including parallel electrode bars and back-up porous plate 27. When a DC voltage is impressed between these electrodes and a substrate 10 by means of the power source 7, positive or negative ions corresponding to the direction of the electric field run in the space 18 to cause the coating material particles to adhere to a surface of the substrate 10. The face-silent discharge electrode of the type shown is for exhausting only the air from the coating space to flow out of the system through a duct 8, as shown by arrow 24, and for causing the powder particles in the coating space 18 to adhere to the substrate. The powder particles which have been charged in virtue of a field ionic current present between the face-silent discharge electrode and a substrate flow countercurrently to air 25 being exhausted. As noted by comparing the arrow 25 with the arrow 26, only gas can be exhausted through the filter cloth 23 and powder particles are attracted by the substrate to counterflow at a speed of up to some ten times the speed of said gas. Thus, it is possible to exhaust only the air from the coating space while practicing satisfactory coating. The use of this type of exhausting face silent discharge electrode will be explained hereinafter in an example.

Figure 9B:
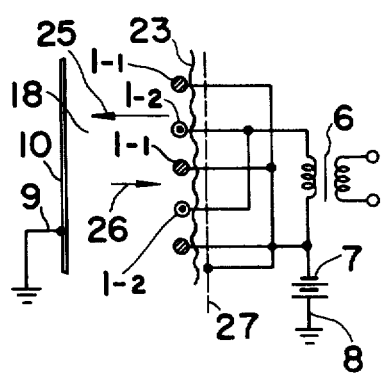
Figure 9C:
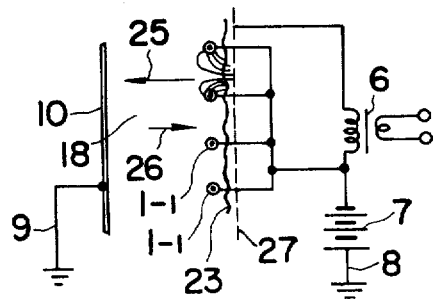
FIG. 9c is a schematic diagram illustrating the structure of another electrode.

Another example of the exhausting-type face-silent discharge electrode is demonstrated in FIG. 9b. An AC voltage is impressed between two adjacent electrode bars 1-1 and 1-2 both coated with an insulator or a semi-conductor and a silent discharge is produced between them. Ions generated by means of a DC power source 7 are introduced into the coating space 18.

Figure 10:
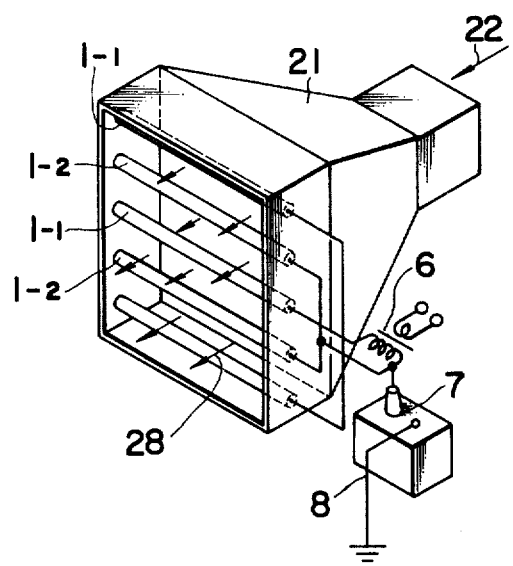
FIG. 10 is a perspective view of one embodiment of a blowing-type face-silent discharge electrode employed in this invention.

Referring now to FIG. 10, alternate parallel electrode bars 1-1 and 1-2 both coated with an insulator or a semi-conductor are connected in common and are fixed to a hood 21 as shown. A mixture of air and a coating material powder is blown in from a duct, shown by arrow 22, against a substrate through spaces between parallel electrode bars 1-1 and 1-2, as shown by arrows 28. This is a blowing-type face-silent discharge electrode for the coating operation. The voltage is applied in the same manner as in FIG. 9a. In an apparatus of this type, although charges of opposite polarities are imparted to powder particles in the course of passing through the spaces between adjacent electrode bars, the particles are again charged to have charges of the same polarity by ions of the same polarity in the coating space after having passed the spaces between electrode bars. As particles charged of the same polarity run at a high speed towards a substrate, the coating performance is the same as those of the apparatus mentioned above. Additionally, a face-silent discharge electrode in the form of a plate, such as those shown in FIGS. 5, 6, 7 and 8 are employable.

In the face-silent discharge electrode employable in the powder coating apparatus of this invention detailed above, the existence, at least of a layer of insulator or semi-conductor for insulating adjacent electrode bars is necessary. Such insulator or semi-conductor forms integral parts of a board, or coats the individual electrode bars separately. The combination of such a board and individually coated electrode bars can also be employed.

When the conductor is exposed in the surface of the face-silent discharge electrode which confronts the surface of a substrate to be coated, the resistivity of the insulator or the semi-conductor employed can be selected from a wide range. However, when electrode bars are buried wholly in an insulator or a semi-conductor, the value of electric resistance of insulator or semi-conductor to be employed is desired not to be high. Usually, a value in the range of $10^8$-$10^{14}\Omega$ cm must be selected in consideration of the service conditions. Employable materials include organic insulators, such as epoxy resins, fluorine plastics and vinyl chloride resins; modified resins thereof having a somewhat lowered resistivity; inorganic insulators or semi-conductors, such as glass, boron nitride, porcelain, cement and asbestos. The frequency of AC voltage employed in this invention of 10-200 Hz is preferred when the effect of preventing powder-adherence to the electrode is desired. Otherwise, a value to be selected need not be limited to said range.

In every explanation concerning an embodiment of this invention mentioned above, feeding powder preliminarily suspended in air into the coating space is referred to as the method of feeding powder. In general, the use of air as dispersion medium is not a necessary condition for feeding a coating material powder dispersed in a gaseous medium. Any suitable gas can be selected, depending, of course, upon the properties of powder used or the like. One method for feeding a coating material powder into the coating space is an electrodynamical method. For example, powder particles fed through ducts or troughs may be preliminarily charged and may be fed to the coating space through an electric field, such as a non-uniform travelling wave alternating electric field and a non-uniform standing wave electric field, by the aid of the gravitational force or a conveying gas. In these cases, an electrodynamic method, e.g. using an electric field curtain device, may be also employed for recovering powder not adhered. FIG. 12 illustrates an example therefor.

In FIG. 12, a substrate 10 in the form of a rectangle is indirectly supported by a guard ring 36 shaped to the form of rectangular ring which surrounds the substrate. The substrate is grounded via a conductor 9. It is constructed such that a face-silent discharge electrode 39 is disposed separated from and confronting the substrate. Electrode 39 is given a silent discharge by means of an AC source 6 and a DC potential is applied between the substrate 10 and the electrode by means of a DC source 7. The faces 37 and 38 as well as the inner surfaces of a hood 40 and rectangular guard ring 36 also constitute face-silent discharge electrodes and a suitable DC voltage and an AC voltage from a DC source and an AC source both not shown are impressed on all of them. Parallel electrode bars are embedded beneath and near the inner surface of a hopper 42 Electrode bars are connected in common every third bar and a three-phase alternating electric field from source 50 is impressed on them to generate a nonuniform travelling wave alternating electric field. Powder particles not adhered to said inner surfaces are immediately excluded through a gate 43.

The powder coating apparatus shown in FIG. 12 is meticulously constructed so as to give a volume density of coating material powder as uniform as possible in the coating space. For this purpose, a coating material powder is fed from powder feed openings 37-1, 37-2, 37-3, 38-1, 38-2 and 38-3 sideways to the lines of electric force which passes from the face-silent discharge electrode to the substrate. Gas is prevented to be entrained by powder particles by means of an electrodynamical force. Concurrently, a coating material powder is fed by an electrodynamical method from powder feed openings 39-1, 39-2 and 39-3 which is provided with the face-silent discharge electrode 39 itself.

To compensate for the fall of particles by gravity, a minute amount of air is exhausted through opening 41 in the upper hood. When the apparatus is so constructed, a flow of gas in the coating space can be controlled to be extremely low. Due to these provisions together with the effect of guard ring 36, an excellent powder layer of even thickness can be formed on the substrate 10 within some seconds. When the coating is finished, an AC voltage is impressed on electrode bars embedded beneath the inner walls except those in the face-silent discharge electrode 39. Thereupon, powder particles on the walls fall. Powder particles which have not adhered can be excluded from gate 43 and recovered by virtue of a three-phase alternating voltage from a power source 50 being impressed on the hopper 42.

Referring to FIGS. 13a and 13b there is shown a detailed illustration of an embodiment of this invention where the inner surface of a pipe-shaped article 10 is powder coated. Substrate 10 is a pipe having a rectangular section. A face-silent discharge electrode 2 having a rectangular section is suspended into said rectangular pipe so as to retain a certain distance between the outer surface of the electrode and the inner surface of the pipe. The face-silent discharge electrode is fixed to the lower end of a duct 45 for powder feeding by a fitting 47 to compose a delivery slit 49. Duct 45 provides powder feeding and, together with said face-silent discharge electrode, is suspended by a retainer (not shown) to maintain a certain distance to the inner wall of the substrate 10.

The upper end of the face-silent discharge electrode 2 is inserted into the lower end of the duct 45 for powder feeding so as to form a space 48 of wedge form for dispersion. A dispersed coating material powder denoted by arrow 46 passes through the slit 49 and is delivered uniformly in the space between the face-silent discharge electrode 2 and the confronting inner wall of the rectangular pipe 10.

The surface-silent discharge generating electrode is an electrode having a structure such as illustrated in FIG. 4a. To generate a silent discharge between adjacent electrode bars, an AC voltage is applied thereto by means of a power source 6. In order to give to the face-silent discharge electrode a potential different from that of a substrate 10 grounded via a conductor 9, a power source 7 is connected to the face-silent discharge electrode via conductors 44. Dispersed powder fed between the face-silent discharge electrode and the substrate 10 through duct 45 as shown by arrow 46 is immediately charged by an ionic current of the same polarity which flows from the face-silent discharge electrode to the substrate 10. By virtue of the electric field between them, a uniformly thick layer of powder is formed on the inner surface of the substrate 10. As the substrate 10 is gradually displaced relative to the face-silent discharge electrode 2 at a certain rate, a uniform layer 19 of coating material powder is built up on the inner surface of the substrate 10 successively from the lower end at a high rate. Thus, an inner surface of an elongated pipe-shaped article can be powder coated with a very simple apparatus with a high efficiency, in accordance with this invention.

It is not always necessary for practicing the powder coating of an inner surface of a pipe-shaped article that a substrate and a coating apparatus are sustained upright as illustrated above. Even if a substrate and a coating apparatus are sustained in oblique or horizontal positions, the powder coating can be performed provided, of course, that powder dispersed in a gas is fed in a coating space or a powder is conveyed into a coating space by an electrodynamic method, such as by a conveying device of an electric field curtain. As the face-silent discharge electrode can be considerably elongated, if necessary, in the apparatus of this system for coating the inner surface of pipe-shaped substrate, a powder which has been introduced into the coating space through the slit 49 can adhere perfectly to the inner surface of said substrate in a 100% coating efficiency. This is a conspicuous feature of a system for powder coating the inner surface of pipe-shaped article according to this invention. By controlling the feed rate of powder and by an adjustment of relative positions of a face-silent discharge electrode and a substrate, a powder layer having depths different in the longitudinal direction of the substrate may be easily obtained. This is also a feature of the system for powder coating the inner surface of a pipe-shaped substrate according to this invention.

Figure 14:
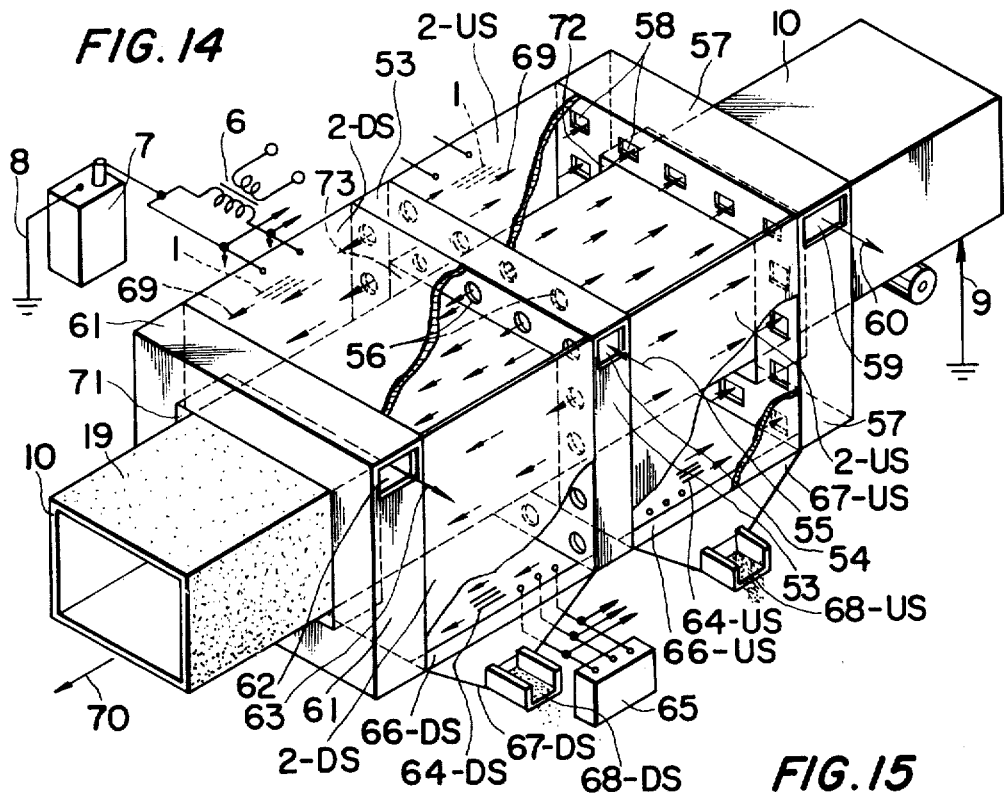
FIG. 14 is a perspective view, partly broken away, of a sixth embodiment of the powder coating apparatus according to this invention.

Now, with referring to FIG. 14, we shall explain the continuous coating of an outer surface of an elongated steel pipe-type article with a powder coating apparatus of this invention. A rectangular duct 53 surrounds a substrate 10 which is continuously moving along the direction denoted by arrow 70. Many injecting openings 56 are arranged on the sides of the duct. A powder coating material conveyed by a gas shown by arrow 55 enters the rectangular duct 53 at a port 54 and is injected from injecting openings 56 upstream to a recovering rectangular duct 57 and downstream to a recovering rectangular duct 61. The side confronting the injecting openings 56 of the upstream recovering rectangular duct 57 is provided with many recovering openings 58 as shown in the figure. Through then, the gas for conveying coating material powder which has been injected from injecting openings 56 is recovered and is excluded from an exit opening 59 as shown by arrow 60.

Similarly, the mixture of a conveying gas and a coating material powder which has been injected from injecting openings 56 directed downstream runs towards the downstream recovering rectangular duct 61. The side confronting the injecting openings 56 of the downstream recovering rectangular duct 61 is provided with many recovering openings not shown. Through them, the gas for conveying the coating material powder is recovered and is excluded from an exit opening 62 out of the system as shown by arrow 63. The rectangular duct 53 for injecting coating material, said upstream recovering rectangular duct 57 and said downstream recovering rectangular duct 61 are connected with two face-silent discharge electrodes 2-US and 2-DS to compose a unit surrounding a substrate 10. Both the upstream electrode 2-US and the downstream electrode 2-DS are of rectangular cylindrical form. In the inner sides of these are arranged many parallel electrode bars denoted by the reference numeral 1.

An AC voltage is impressed between the adjacent electrode bars 1 by means of a power source 6. Moreover, a DC voltage is impressed on them by a power source 7 grounded via conductor 8 to generate a high potential difference to substrate 10 grounded via conductor 9.

In the apparatus constructed as mentioned above, positive or negative ions flow from the face-silent discharge electrodes 2-US and 2-DS to the substrate 10, depending on the DC voltage between them, generated by the power source 7. A strong DC field is present between the substrate 10 and the face-silent discharge electrodes. Thus, coating material particles carried by the conveying gas denoted by arrow 69 are strongly charged and adhere to the surface of the substrate 10 promptly to form a powder layer 19 even in thickness, due to both of the above effects. As the substrate 10 moves from right to left as shown by arrow 7, the parts where the coating has been finished successively leaves the coating apparatus as the parts to be coated enter the coating apparatus. Thus, a stable continuous operation of coating is allowed.

For recovering any powder particles which have not adhered and have fallen to the lower surface of the substrate, electrode bars in the surface of the face-silent discharge electrode confronting the bottom surface of the substrate 10 are connected to every third bar and a three-phase alternating voltage from the power source 65 is impressed thereon to generate a non-uniform travelling wave alternating electric field on the surface. Accordingly, face-silent discharge electrodes 64-US and 64-DS convey a minute amount of particles which have fallen to slits 66-US and 66-DS to collect. These particles can be easily recovered from excluding openings 68-US and 68-Ds. In other words, the face-silent discharge electrode functions as a recovering device in collecting powder particles not adhered, if any, together with feeding an ionic current for coating and forming an electric field for adhering, in this case. Although there are gaps 71 and 72 between two recovering rectangular ducts and the substrate 10 for allowing a relative motion of the substrate and the coating apparatus, the apparatus of this invention can be constructed so as to exclude no coating material powder from these gaps, because ambient air is allowed to enter the apparatus through these gaps and can be exhausted from the exit openings 61 and 62 together with the conveying gas as shown by arrows 60 and 63.

In addition, the case when the coating apparatus is fixed and the substrate 10 is moved is explained above. It is possible, however, that an outer surface of a substrate is continuously coated by fixing said substrate and moving a coating apparatus itself. Moreover, an inner surface and an outer surface of a pipe-shaped substrate can be powder coated at the same time by concurrently employing both the coating apparatus for inner surface disclosed in FIG. 13 and the coating apparatus for outer surface disclosed in FIG. 14.

Figure 15:
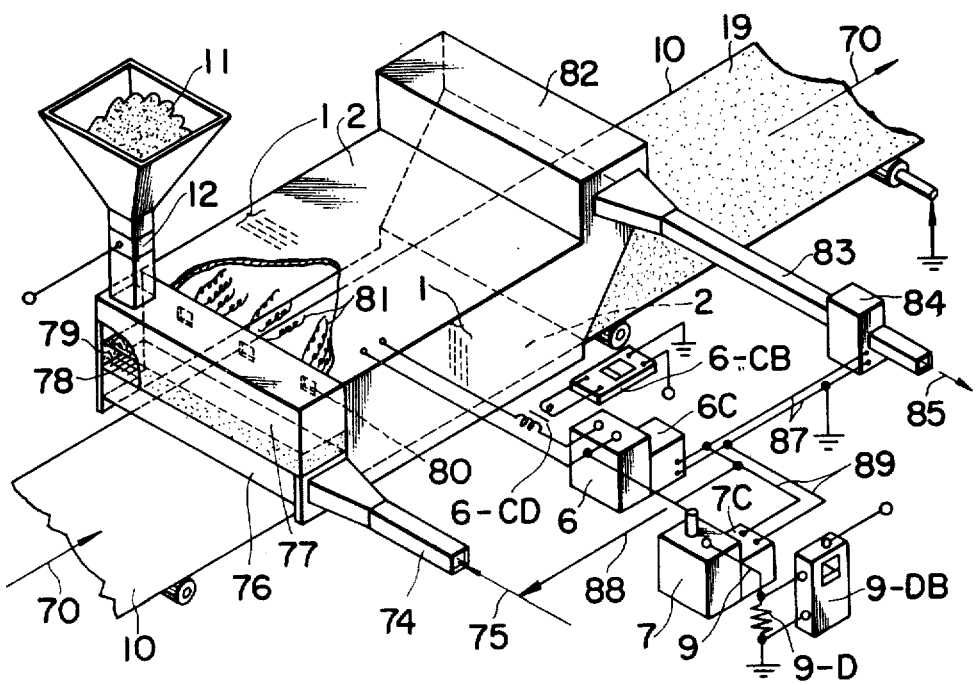
FIG. 15 is a perspective view, partly broken away, of a seventh embodiment of the powder coating apparatus according to this invention.

A powder coating apparatus according to this invention for continuously coating a single side of a substrate of continuously fed sheet and a method for controlling the powder layer formed is now described. Referring to FIG. 15, parallel electrode bars 1 are disposed in the inner side of a face-silent discharge electrode 2 which is disposed to be separated from and to confront a surface of a substrate 10 proceeding continuously in the direction shown by arrow 70. An AC voltage from an AC source 6 is impressed between them to generate a silent discharge. Positive or negative ions produced by said discharge are stably fed to an upper surface of the substrate 10 by virtue of a DC voltage impressed from a DC power source 7. A powder coating material 81 which has been injected towards the upper surface of the substrate from injecting opening 80 electrostatically, rapidly adheres to the surface of the substrate 10 to form a powder layer having an even thickness.

In this case, the bulk powder coating material 11 is fed to a coating material powder-fluidizing chamber 77 by means of a coating material feeder 12. The floor of said coating material powder-fluidizing chamber is composed of a perforated board 78 which in turn is the ceiling of a blowing chamber 76. As air 75 for fluidizing is being blown into said blowing chamber through a duct 74, a fludizing coating material powder 79 is always present in the lower part of the coating material powder fluidizing chamber 77. The powder which has been dispersed to a suitable extent by the air 77 is stably injected from the injecting opening 80.

When the face-silent discharge electrode confronting the substrate 10 is sufficiently long in the direction shown by arrow 70 in the powder coating apparatus of this invention, the process can be devised so that a large quantity of powder particles not adhered does not remain in the gas exhaust through the duct 83. However, as the electric resistance of powder coating material varies in a markedly wide range, depending on the humidity of the gas, and the properties of the powder itself vary in a wide range, it may be extravagant in many cases that the face-silent discharge electrode is made to be sufficiently long, in the direction shown by arrow 70, for all these cases. Accordingly, the length of the electrode is adequately determined and the operating conditions of the silent discharge generating electrode 2 are adjusted thereto. When, in this way, the size of the apparatus is reduced and a control of the quality of the resulted coating material powder layer is performed, a satisfactory utility will be obtained in many cases from the viewpoint of the practice.

An automatic control system for such control of quality is also illustrated in FIG. 15. Powder particles not adhered which are contained in the exhaust duct 83 is detected by a powder concentration detector 84 and the output signal thereof is fed back to a voltage controlling device 6c for an AC source 6 and to a 6c controlling device 7c for a DC source 7. As the intensity of a silent discharge generated on the surface of a silent diacharge electrode is dependent upon the humidity in a gas, said humidity may be detected by means of a current transformer 6-DC and the output signal therefrom also may be fed to an AC voltage-controlling device 6C.

In some cases, are necessary a control of the value of a DC voltage to be impressed on a face-silent discharge electrode 2. Depending upon the resistivity of the coating material powder employed, and also a control of the value of DC current. Such controls are performed with a direct current-detecting resistance 9D and a direct current-controlling device 9-DB. The DC and AC voltages may be automatically controlled by the outputs from an alternating silent discharge current detector 6-CB and said direct current-controlling device 9-DB, respectively. Manual controls of the operation may be effectively performed by viewing indicators attached to these detectors.

Figure 16:
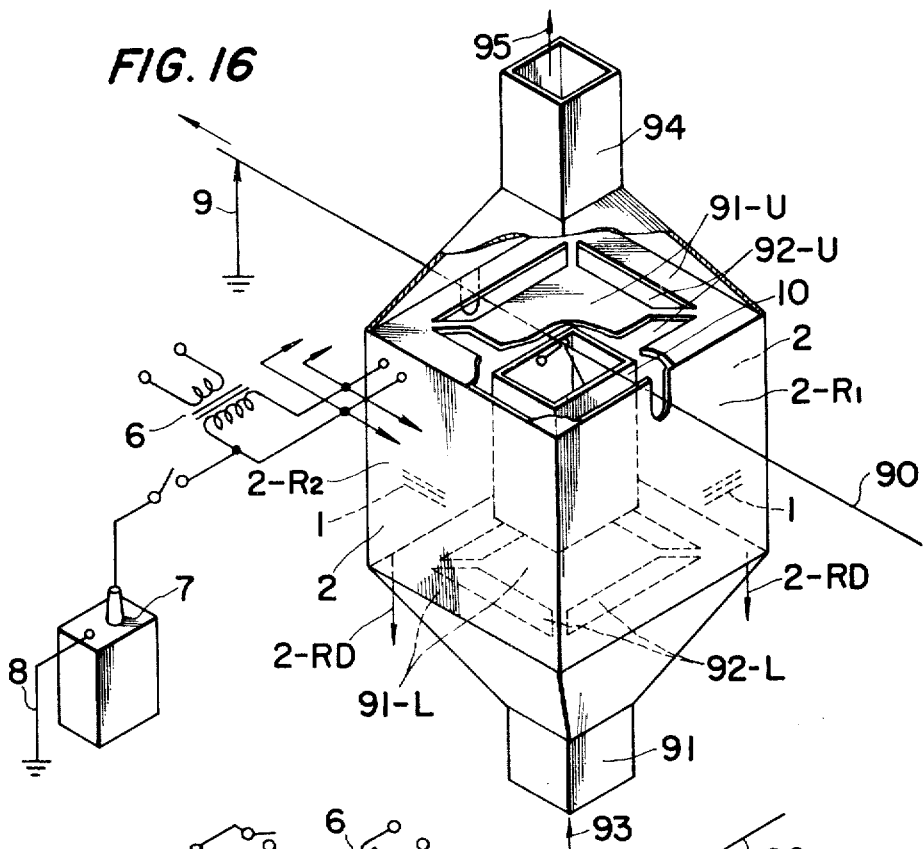
FIG. 16 is a perspective view, partly broken away, of an eighth embodiment of the powder coating apparatus of this invention.

Referring to FIG. 16, the apparatus shown is used for coating an outer surface of a separate body, such as a utensil or a case for an electrical appliance in accordance with this invention. Baffles 91-U and 91L having rectangular pipe-formed slits 92-U and 92-L positioned in horizontal planes are arranged over and under face-silent discharge electrodes 2, 2-R1 and 2-R2, respectively. The electrodes are combined in the form of an upright rectangular pipe. Over and under the baffles are positioned an upper hood and duct 94 and a lower hood and duct 91, respectively. A high AC voltage from a power source 6 is impressed on face-silent discharge electrodes 2, 2-R1 and 2-R2, to provide a face ion source. Simultaneously, a high DC voltage is impressed thereon by a power source 7 and a conductor 8.

A substrate 10 to be coated is suspended by a conveyor line 90 which is grounded via a conductor 9. The face ion source 2-R1 is vertically movable as shown by arrow 2-RD and forms a door. As the substrate is forwarded, the door is lowered. Then, the substrate 10 is set in the position corresponding to the center of face-silent discharge electrodes 2, 2-R1 and 2-R2. Thereafter, the ion source 2-R1 is closed. The surface of the substrate 10 to be coated is thus surrounded with face ion sources on all sides. A powder coating material suspended in a gas is introduced upwardly into the apparatus, as shown by arrow 93. The mixture of powder coating material and gas moves upward, being directed by slits 92-L and 92-U, in a space between face ion sources and the substrate, meanwhile a silent discharge is generated on the surfaces of face ion sources and a high DC voltage is impressed between said face ion sources and the substrate by a power source 7.

The upward moving powder coating material immediately forms a powder layer uniform in thickness on the surface of the substrate 10. When the substrate 10 is considerably long (i.e., in the vertical direction in the case of FIG. 16), the face-silent discharge electrodes may be divided in several sections in the vertical direction, as illustrated in FIG. 4b. The voltages impressed on them as well as the timing of impression may be controlleld to obtain a coating having desired distribution of thickness on the substrate. Usually, the coating efficiency may attain to 95% or more.

It is, of course, possible that coating material powder particles not adhered is recovered by suitable means and is re-used. Thus, the powder coating of the substrate 10 is completed within some seconds or more. Then, the ion source 2-R2 (i.e., the door), is lowered and the substrate is removed by means of the conveyor line 90 and a new substrate is introduced in the apparatus. By the sequence of the steps above, separate bodies can be coated at a high efficiency within a short period of time without causing environmental pollution.

In addition, although the face-silent discharge electrodes in FIG. 16 are planar, said electrodes within the scope of this invention can have suitable curved surfaces for coating outer surfaces of separate bodies. By virtue of curved surfaces of the electrodes, a uniformly thick coating will be formed even on surfaces of a body having an extremely complicated shape in a short time. Further, the face ion sources surrounding a substrate may be divided into parts and different AC voltages may be impressed on said parts depending upon both the shape of substrate and required thicknesses of the coatings. By applying these techniques, an excellent coating film having better performance than those by a prior electrostatic powder coating can be obtained in a short period of time. The coating efficiency is nearly 100 % which is characteristic of the practice of this invention.

In apparatus of this invention for powder coating surfaces of separate bodies, objects, such as the increase of efficiency of the apparatus, reduction in size of apparatus and prevention of generating coating material over-spray, can be effectively achieved by employing, as face-silent discharge electrodes, exhausting types or blowing types which are illustrated in FIG. 9a, 9b, 9c, 10 and 11, not to mention the plane-silent discharge electrode.

Figure 18:
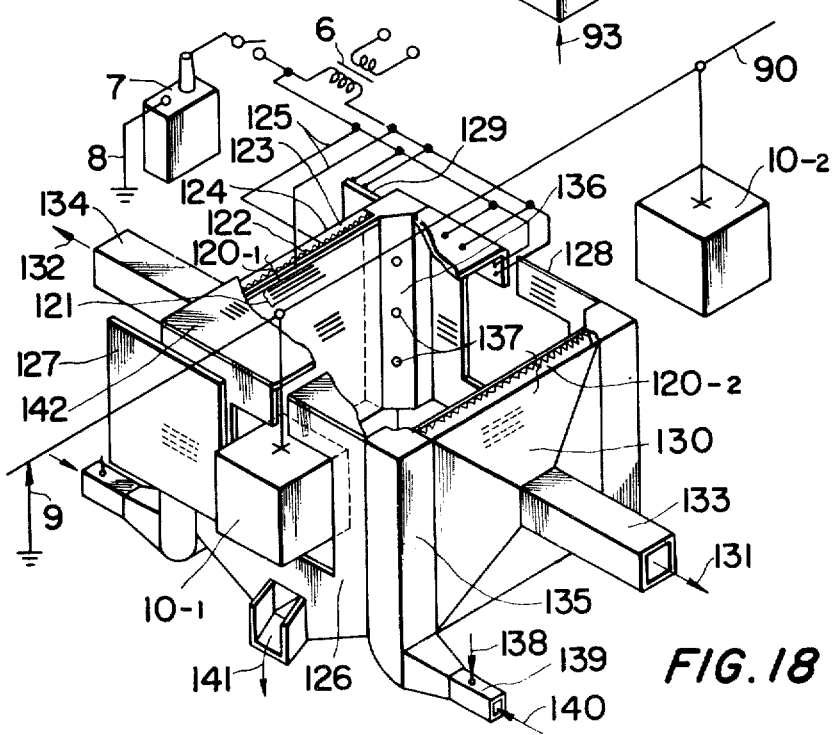
FIG. 18 is a perspective view, partly broken away, of a twelfth embodiment of the apparatus of this invention.

Referring to FIG. 18, a body 10-1 is a substrate the entire surface of which is required to be powder coated and is suspended by a conveyor line 90 earthed via a conductor 9 and is being introduced to a coating apparatus of this invention. A body 10-2 is a finished substrate. As the conveyor line 90 proceeds, a door 127 of which the inner side constitute a face-silent discharge electrode is opened and the substrate 10-1 is continuously introduced into the coating apparatus. In the powder coating apparatus of this embodiment of the present invention, two of four sides of the coating chamber, which are perpendicular to the direction of moving conveyor are composed of a face-silent discharge electrode 128 and a door 129 and a face-silent discharge electrode 129 and a door 127. The ceiling of the chamber is composed of a face-silent discharge electrode 142 and the floor is composed of a bottom face-silent discharge electrode not shown. The sides 120-1 and 120-2 which are parallel to the direction of the conveyor line 90 are composed of face-silent discharge electrodes of the exhausting type as shown by FIG. 9a. As the gas in the apparatus is exhausted through a duct 133 and a hood 130 and a duct 134 as shown by arrows 131 and 132, a small quantity of ambient air is introduced through interstices between doors and frames and slits for allowing hangers which support substrates. Due to this exhausting, the coating material powder is prohibited from passing out of the apparatus. The coating material powder is fed from coating material-injecting devices 135 and 136 which are disposed at the four corners of the chamber.

In the coating material-injecting devices 135, air 140 is blown in and carries the powder coating material fed as shown by arrow 138 at a high speed through a duct 139 to feed the injecting device 135. The injecting device 135 feeds the coating chamber with a coating material powder suspended in air, through an injecting opening 137 of each injecting device. As both lines of electric force and ion currents flow to the substrate in the chamber from all directions, all surfaces of the substrate can be coated within some seconds.

Although the coating material-carrying air and the air from interstices of the chamber are exhausted as shown by arrows 131 and 134, the coating material powder is attracted by the substrate irrespective of the flowing direction of air. This effect is given by the use of face-silent discharge electrodes as shown in FIG. 9a. No coating material powder passes out of the chamber and a powder coating of separate bodies is performed safely and rapidly. As the floor of the apparatus is composed of a face ion source capable of transferring powder due to a travelling wave-type electric field, a minute quantity of powder particles not adhered can be excluded from the apparatus, if necessary, as shown by arrow 141. A high AC voltage is impressed on every face-silent discharge generating electrodes by means of an AC power source and a high DC voltage is concurrently impressed on the same, as in other cases.

Face-silent discharge electrodes 120-1 and 120-2 include parallel electrode bars 121 which are arranged at suitable distances, coated with an insulation and disposed in the inner surface part of the electrode. A filter cloth is extended downstream. A backup plate is disposed further downstream. Behind backup plate is a hood 124 to form a blowing chamber 123. The electrode is constructed so that the air may be exhausted from a duct 134 as shown by arrow 132.

In FIG. 18, the powder coating apparatus coats all the surfaces of the substrate which is surrounded by a plurality face-silent discharge electrodes. However, it is not always necessary that all the surfaces to be coated are surrounded simultaneously with face-silent discharge electrodes in accordance with the coating apparatus of this invention. The coating can be practiced by rotating a substrate, by selecting the positions of the coating material feeding openings, or by selecting the directions in which a coating material is blown in, without all the surfaces to be coated being surrounded by face-silent discharge electrodes. These embodiments are described in the following.

Figure 19A:
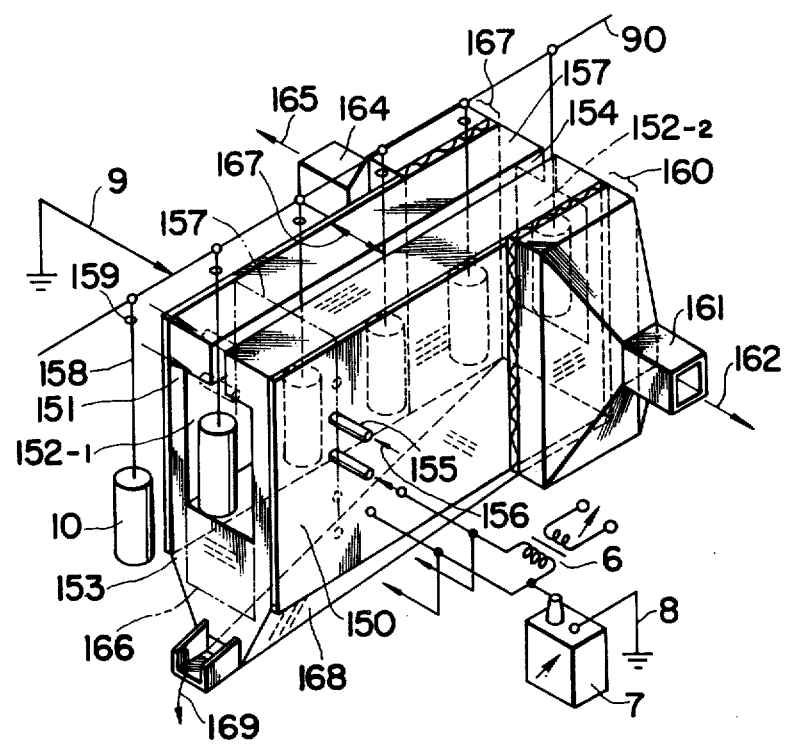
FIG. 19a is a perspective view of a thirteenth embodiment of the powder coating apparatus of this invention.

Referring to FIG. 19a, a plurality of substrates 10 are introduced successively into a coating apparatus through an opening 152-1 by means of a conveyor line 90 which is grounded via a conductor 9. Completed substrates exit one by one through an exit 152-2. The inner surface of sides 150 and 151 are composed of face-silent discharge electrodes according to this invention. Of the sides 150 and 151, the inner surface parts adjacent to the exit 152-2 of the coating apparatus are composed of face-silent discharge electrodes 160 and 167 of exhausting type. The inner surface part 153 at the entrance of the apparatus and the inner surface part 154 at the exit are composed of face-silent discharge electrodes. Moreover, the ceiling is also composed of face-silent discharge electrodes and includes a slit 157 for passage of hangers 158 which support the substrates. Further, the floor 168 of the apparatus is composed of a face-silent discharge electrode of the travelling wave type. A high AC voltage from a power source 6 is impressed on the inner surface parts 150, 151, 153 and 154, the inner surface parts of the electrodes 160 and 163, and the surface parts confronting the slit 157. In addition, a DC voltage from a power source 7 and a conductor 8 is impressed on every inner surface part so as to generate a DC electric field between the substrates 10 and said inner surface parts. A three-phase alternating voltage is impressed on the inner surface part of the floor 168 by a power source not shown to generate a silent discharge of the travelling wave type.

As a result of such construction, all the coating material particles introduced through an inlet 155 as shown by arrow 156 are charged during their suspension in the space of the apparatus and travel toward the surface of the substrate to adhere to and form a coating layer. This is achieved by virtue of the DC electric field and the ion currents which flow from every face-silent discharge electrode to ground via substrates 10, hangers 158, conveyor line 90 and conductor 9. A rotating device 159 for rotating the hanger is mounted on each hanger such that the substrate 10 always rotates while proceeding through the coating space of the apparatus. The powder particles which travel toward the substrate thus form a powder layer uniform in thickness on the substrate.

As the mixture of air and coating material powder is fed at a location relatively near to the entrance and the face-silent discharge electrodes of exhausting type are disposed adjacent the exit, the air in the apparatus flows generally in the direction from the entrance to the exit. Only air which has lost almost all suspended powder particles is exhausted through face-silent discharge electrodes 160 and 163 of the exhausting type as shown by arrows 162 and 165. A minute quantity of powder particles not adhered, if any, is automatically recovered as shown by arrow 169 by means of the silent discharge electrode 168 which constitutes the floor of the apparatus.

Figure 19B:
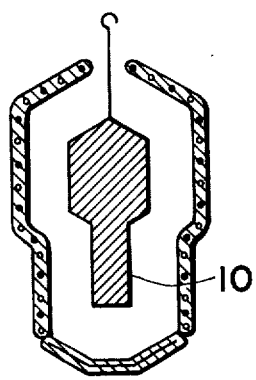

When the continuous coating of a multiplicity of articles having a relatively small size is desired, the substrates 10 can be continuously powder coated by employing silent discharge electrodes in the form of simple plane in accordance with the apparatus of this invention. In some cases, the coating of various kinds of articles is desired. In these cases, when the dimension and the shape of the substrate are different to a considerable extent, the powder coating can be easily achieved by dividing the face-silent dischage electrode into parts and impressing a different AC voltage and a different DC voltage on each of said parts, or by merely regulating the DC voltage. However, when the substrate has a highly different shape or dimension, the following techniques are used. If the diameters of substrates are far different, the breadth of the apparatus should be regulated as shown by the reference numeral 167. In case the lengths of substrates are far different, the length of the part of the apparatus shown by an imaginary line 166 is varied. When a substrate has a complicated cross section such as shown in FIG. 19b, a coating of good quality will be obtained at a high efficiency by adjusting the shape of the face-silent discharge electrodes disposed to be separated from and to confront the substrate. The provision of face-silent discharge electrodes of various dimensions and/or shapes corresponding to substrates of various dimensions and/or shapes thus enables the apparatus to powder coat various substrates.

The apparatus of the present invention is not limited to a conveyor system with a high DC voltage impressed on face-silent discharge electrodes. The powder coating can be practiced even when a high DC voltage is impressed on the substrate 10 via a contacting device installed on the conveyor line or when the hangers are insulated from conveyor line. Whether the coating is performed with positive ions, or with negative ions depends upon the electrification characteristics of a coating material powder. Thus, both kinds of ion current are employable.

In the above description, the coating material powder is suspended in a gas introduced between the substrate and face-silent discharge electrodes confronting the substrate, irrespective of the method for conveying employed, i.e. conveying by a gas flow or conveying by an electrodynamical force. As discussed below, powder coating can be carried out even when a coating material powder is fed to a face-silent discharge electrode itself disposed to be separated from and to confront the substrate and not suspended in a gas. This is advantageous, especially in the case where a substrate has a special dimension or size.

Figure 20A:
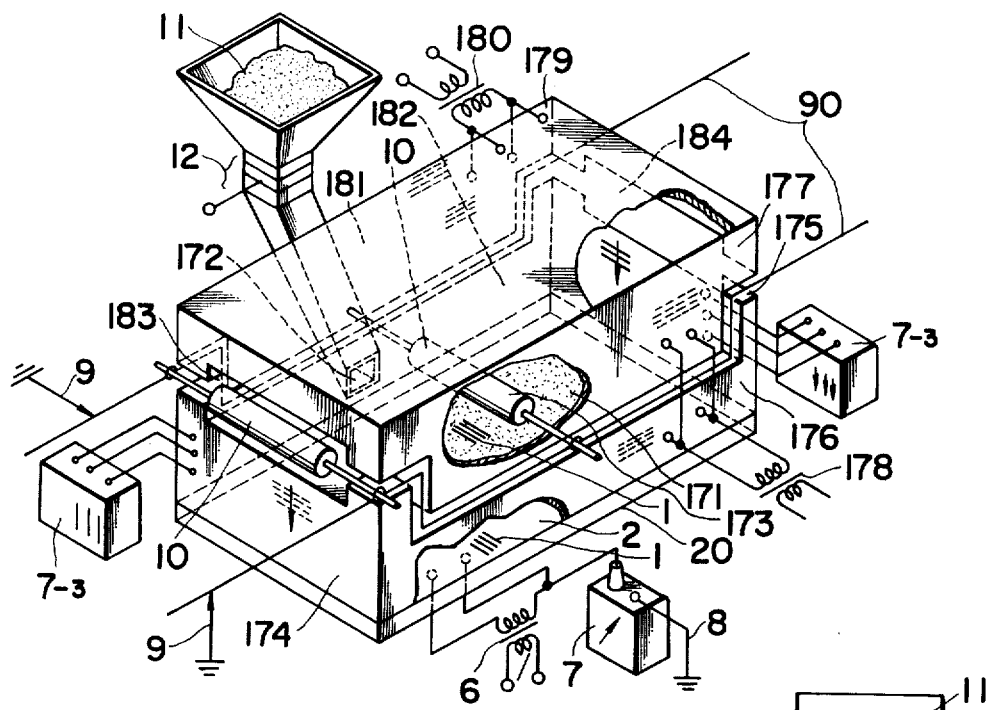
FIG. 20a is a perspective view, partly broken away, of a fourteenth embodiment of the powder coating apparatus of this invention.
Figure 20B:
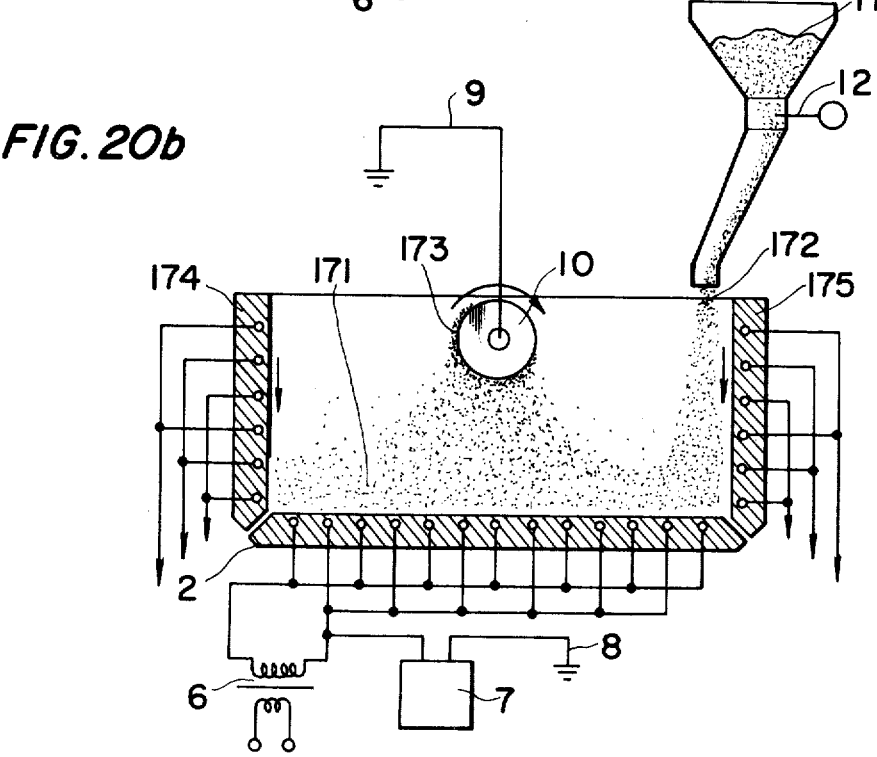

Referring to FIG. 20a which is detailed oblique view of the apparatus and FIG. 20b which is a schematic sectional view of the same, a substrate 10 is grounded via a conductor 9 and is introduced into the coating apparatus through an entrance 183 by means of a conveyor device 90. A coated substrate leaves the apparatus through an exit 184. The floor 20 of the powder coating apparatus of this invention has an inner surface part which is composed of a face-silent discharge electrode 2. A high AC voltage from a power source 6 is impressed between every two adjacent electrode bars 1 of the electrode and the whole electrode is connected to a DC power source 7 and a conductor 8 to apply a DC potential against the grounded substrate. The inner surface of a side wall of the entrance 183 is composed of a face-silent discharge electrode 174 which generates a travelling wave alternating electric field which proceeeds downwardly. The inner surface part of the side wall of exit 184 is composed of a face-silent discharge electrode 177 which generates a travelling wave alternating electric field which proceeds downwardly. On a side wall 176, a ceiling 179 and a side wall 181 is impressed by means of a power source 180, a weak alternating voltage which is sufficient for preventing adherence of powder particles, but not sufficient for generating a silent discharge. A power source 7-3 feeds the electrode 174 as well as the electrode 177 with a three-phase alternating electric field.

In this apparatus, a powdery coating material 11 stored in a hopper is fed from an opening 172 of a chute via a powder feeder 12 directly to the face-silent discharge electrode 2 which constitute the floor of the apparatus. Reference numeral 1 denotes electrode bars in the inner surface part of the face-silent discharge electrode of the floor. As a result, the powder fed is charged immediately by a silent discharge which has been generated over the entire surface of the floor 2. The charged particles are repelled by the face-silent discharge electrode to suspend in a dispersed state. Such particles form a very thin fluidized bed-like cloud. When a rotating substrate 10 grounded via a conductor 9 is disposed in said cloud of coating material particles, only particles positively or negatively charged (depending upon the direction of electric field), adhere quickly to the surface of the substrate to form a coating material powder layer 173, due to the electric field between the substrate and the floor of the coating apparatus. Particles suspended in the cloud 171 have a charge of opposite polarity to that of the particles travelling to the substrate by the electric field toward the floor 20.

However, in the course of travelling toward the floor, the oppositely charged particles lose their charge and are imparted with a charge of opposite polarity to return to cloud 171 of coating material particles.

Thus, all the powder particles fed adhere eventually to the substrate 10. In this embodiment, means for feeding a powder in a dispersed state is not required. The repelling force to powder particles of a face-silent discharge electrode itself is utilized to suspend the coating material powder into a homogeneously dispersed state for coating. A powder layer having excellent characteristics can be formed within in a short time with very simple apparatus. This invention provides a compact and efficient powder coating apparatus for powder coating articles of small size.

Face-silent discharge electrodes of three-phase type capable of generating travelling wave alternating electric fields which proceed downwardly are employed in the inner surface parts of side walls to prevent suspended coating material powder from travelling upwardly along the side walls. The face-silent discharge electrodes disposed in the side walls of the apparatus generate a travelling wave alternating electric field which drives the powder particles downwardly.

In accordance with the powder coating apparatus of this invention, inner surfaces of articles having depressions, such as bottles, bombs and caps, can be easily powder coated at a high speed to form an excellent coating, with an apparatus of small size. A suitable apparatus therefor will be described in the following.

FIG. 17a is a side view, partially showing sections, of a powder coating apparatus of this invention where an inner surface of a substrate 10 having a bomb-like shape is being coated. FIG. 17b is a horizontal cross section of a part of said apparatus. In accordance with the apparatus for coating inner surfaces of a separate body of this invention, a coating material powder 11 stored in a hopper is fed to a ring fluidizing chamber 77 via powder coating material feeder 12. Under the fluidizing chamber 77 is installed a ring gas feeding chamber 76. Chamber 77 is separated from chamber 76 by a perforated plate 79. A gas is injected into the gas feeding chamber 76 by a fan 99 as shown by arrow 114 and through a valve 97. The coating material powder 81 which has been fluidized by the injected gas fed from the blowing chamber 76 in the fluidizing chamber 77, gushes forth upwardly in a suspended state through a plurality of holes 80 arranged in the ceiling of chamber 77. A face-silent discharge electrode 2 of stick shape is installed in the central part of the apparatus. In the outer surface part of the stick, are arranged electrode bars 1-1 and 1-2 of spiral form so as to generate a silent discharge over the entire outer surface of the stick. The stick is hollow and is provided with a small hole at the bottom from which the gas is exhausted to be excluded as shown by arrow 113.

With this apparatus, a substrate 10 is positioned over the face-silent discharge electrode of stick shape so that the inner surface of the substrate and the outer surface of the electrode are in concentric relation. Valve 97 is opened and suspended powder coating material is allowed to gush forth into the coating space 18 between the inner surface of the substrate and the face-silent discharge electrode. In this case, powder coating material which is carried by the blown gas from blowing chamber 76 rises in the space 18. The gas flows into the inside 116 of the face-silent discharge electrode via a small top hole 112 to be exhausted as shown by arrow 113. An AC voltage is impressed between two adjacent electrode bars by a power source 6 and a DC voltage is impressed between the face-silent discharge electrode and the substrate 9 by means of a power source 7 and a conductor 8.

Thus, uniform ion currents flow radially outwardly from the face-silent discharge electrode 2 to the substrate 10. In addition, there is an electric field having an extremely high intensity between them due to the power source 7. Therefore, the coating material powder adheres, initially to the lower parts, to the inner surface of the substrate 10. A powder layer having uniform thickness is obtained over the entire inner surface of the substrate after some seconds. When the coating as such is continued, particles not adhered will flow through the small hole 112 and reach the device 84 for detecting powder at the outlet. When this is the case, a control device 96 is energized so as to stop the feeding of the gas into the blowing chamber 76. A normally closed valve 98 is opened, and all remaining coating material particles are carried by the gas blown in through a gas inlet 111 and flow through the inside 116 to be recovered. Then, the substrate 10 is removed.

The coating of the inner surface of a separate body is thus completed while completely preventing the fly losses due to over spray. Accordingly, the inner surface of a separate substrate 10 is coated without any special recovering installation by employing the substrate itself as a recovering device in accordance with this invention. An excellent coating on the inner surface is easily obtained at a high speed with an apparatus of small size. The procedure can be practiced even when the apparatus, the longitudinal sectional view thereof is shown in FIG. 17a, does not have a concentric relationship with the substrate as shown in FIG. 17b. The apparatus of this invention can be employed for powder coating the inner surface of an elongated article having U-shaped section. One example of such apparatus is illustrated by FIG. 17c which is an oblique view thereof.

Moreover, both the inner surface and the outer surface of a substrate 10 can be concurrently powder coating to form powder layers. The procedure is exemplified in FIG. 17d on which a face-silent discharge electrode 2 is arranged to confront both the inner surface and the outer surface of a hollow cylindrical substrate 10. Other structures are the same as in FIG. 17a.

As mentioned above, many modifications of this invention can be made, depending upon shapes, sizes, numbers etc. of the substrate. To practice the invention, the construction of the face-silent electrodes should be selected so as to generate safely and surely a silent discharge. A suitable field strength and a suitable current density at the surface of the substrate should be selected, depending upon the properties of coating material used. The feed rate of the powder and the coating time should be selected to be suited to the conditions mentioned above. This invention has various modifications and the fundamental conditions for practice are quite broad.

An example concerning the coating of the inner surface of a rectangular pipe, such as shown in FIGS. 13a and 13b, is described as representative. The substrate is a steel pipe for piping having an inner diameter of 16 mm and a length of 5.5 mm. The inner surface of said pipe is to be coated with an epoxy resin powder coating material. A face-silent discharge electrode of 3 mm in outer diameter and 5 mm in length is coaxially disposed in the steel pipe to be coated. The face-silent discharge electrode is suspended at the lower end of a pipe for powder feeding. The face-silent discharge electrode fixed to the pipe for powder feeding is suspended into the upright steel pipe. An epoxy resin coating material powder is fed at a rate of about 45 g per minute through the pipe for powder feeding. The face-silent discharge electrode is made of a vitreous insulator. Two conductor electrode bars of 0.3 mm in breadth are embedded in parallel at a depth of 0.3 mm. Embedded electrode bars form two parallel spirals having a pitch of 6 mm. An AC voltage of 4.5 KV, 50 Hz is impressed between two electrode bars. The potential of the face-silent discharge electrode is maintained at 5.5 KV against the grounded substrate of steel pipe. The coating is performed while maintaining the relative speed between the face-silent discharge electrode and the substrate of pipe at 5 cm/sec. After baking, a uniformly thick coating of 200 $\mu$ in mean thickness with a standard deviation of $\pm 10$ $\mu$ is obtained. Ten pieces of coated pipe were examined and no pinholes found. The coating efficiency attains to 95% in this case.

Figure 6:
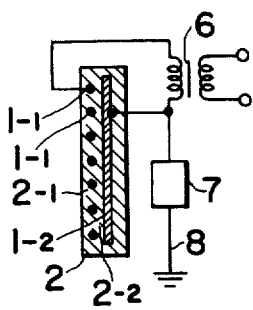
Figure 7:
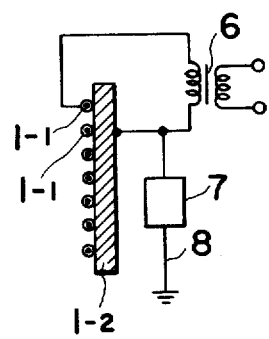
Figure 8:
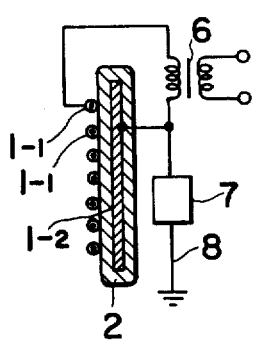

An example of coating the surface of a sheet which is continuously fed, as shown in FIG. 15, follows. The substrate coil is of 30 cm in breadth. The speed of the substrate is of 20 cm per minute. The insulator of the electrode is of an epoxy resin which have been modified to have a low volume resistivity. The shape of the face-silent discharge electrode 2 employed is as shown in FIG. 6. The electrode bars and the face electrode are embedded in the insulator of said epoxy resin. The breadth of electrode bar is of 0.5 mm and the spacing thereof is of 5 mm. A face-silent discharge electrode where the spacing between the face electrode and the plane including electrode bars is of 1 mm is employed. An AC voltage of 4000 V, 50 Hz is impressed between the electrode bars and the face electrode. The spacing between the face-silent discharge electrode 2 and the substrate 19 is maintained at a value of 10 cm. The length of the face-silent discharge electrode in the direction of proceeding of the substrate is of 70 cm and the breadth is of 36 cm. The potential of the face-silent discharge electrode is maintained at a value of $-30$ KV against the grounded substrate. A polyester coating material powder stored in a hopper is fed through a feeder at a rate of 1300 g per minute. The air for powder feeding, shown by arrow 75 in FIG. 15, is fed at a rate of 2.7 m$^3$ per minute. A uniformly thick coating is continuously formed on the substrate. After baking, a coating of 250 $\mu$ in thickness with standard deviation of $\pm 15$ $\mu$ is obtained and no pinholes found.

The embodiments of the invention in which an exclusive property or privilege is claimed are defined as follows.

1. An electric discharge coating apparatus for powder coating a substrate comprising a face-silent discharge electrode disposed to be separated from and to confront said substrate, means for introducing a powder coating material into a space between said face-silent discharge electrode and said substrate, power supply means coupled to said face-silent discharge electrode for impressing an AC voltage to cause a silent discharge on a surface of said face-silent discharge electrode, and means for impressing a voltage between said substrate and said face-silent discharge electrode.

2. The coating apparatus as defined in claim 1, wherein said face-silent discharge electrode surrounds the surface of said substrate being coated.

3. An electric discharge coating apparatus as defined in claim 1, wherein said face-silent discharge electrode is disposed to provide a uniform field strength everywhere on the surface of said substrate being coated.

4. An electric discharge coating apparatus as defined in claim 1, wherein said face-silent discharge electrode is composed of a plurality of parallel electrode bars spaced at equal distances.

5. An electric discharge coating apparatus as defined in claim 1, wherein said face-silent discharge electrode is composed of a plurality of parallel electrode bars spaced at equal distances and a face electrode, said face electrode being disposed at a distance from and parallel to the face including said plurality of parallel electrode bars.

6. An electric discharge coating apparatus as claimed in claim 4, wherein said power supply means for impressing an AC voltage is an AC power source coupled between two adjacent electrode bars.

7. An electric discharge coating apparatus as defined in claim 4, wherein said power supply means for impressing an AC voltage is means for coupling in common every third electrode bar and coupling a three-phase alternating power source to three groups of electrode bars.

8. An electric discharge coating apparatus as defined in claim 5, wherein said power supply means for impressing an AC voltage is an AC power source which is coupled between said plurality of parallel electrode bars and said face electrode, said face electrode being disposed parallel to the face including said plurality of electrode bars.

9. An electric discharge coating apparatus as defined in claim 1, wherein said means for impressing a voltage between said substrate and said face-silent discharge electrode is a high voltage DC power source which is connected between every electrode bar and said substrate.

10. An electric discharge coating apparatus as claimed in claim 1, and further including a duct for feeding powder on one edge of said discharge electrode and an opening for recovering dust positioned on another edge of said discharge electrode.

11. An electric discharge coating apparatus as defined in claim 5, wherein said face electrode is a pecticulately perforated plate.

12. An electric discharge coating apparatus as defined in claim 1, wherein said face-silent discharge electrode defines the inner surface of a guard ring for use with a rectangular plate-shaped substrate.

13. An electric discharge coating apparatus as defined in claim 1, wherein said substrate is pipe-shaped and said face-silent discharge electrode is disposed in concentric relation to said substrate.

14. An electric discharge coating apparatus as defined in claim 13, wherein said substrate is pipe-shaped and said face-silent discharge electrode is a tubular duct positioned to at least partially surround said substrate.

15. An electric discharge coating apparatus as defined in claim 1, wherein said face-silent discharge electrode is an inner surface of a pipe having a rectangular section and said substrate has an outer surface to be coated and is disposed in said pipe.

16. An electric discharge coating apparatus as defined in claim 1, and further including means for controlling the voltage applied to said face-silent discharge electrode to provide a coating of a predetermined property.

* * * * *